United States Patent
Yokozawa et al.

(10) Patent No.: US 10,352,428 B2
(45) Date of Patent: Jul. 16, 2019

(54) SLIDE COMPONENT, BICYCLE COMPONENT, BICYCLE REAR SPROCKET, BICYCLE FRONT SPROCKET, BICYCLE CHAIN, AND METHOD OF MANUFACTURING SLIDE COMPONENT

(71) Applicant: SHIMANO INC., Sakai (JP)

(72) Inventors: Dai Yokozawa, Sakai (JP); Wataru Yamauchi, Sakai (JP); Michiaki Komada, Sakai (JP); Takeshi Oi, Sakai (JP)

(73) Assignee: SHIMANO INC., Sakai (JP)

( * ) Notice: Subject to any disclaimer, the term of this patent is extended or adjusted under 35 U.S.C. 154(b) by 122 days.

(21) Appl. No.: 15/083,235

(22) Filed: Mar. 28, 2016

(65) Prior Publication Data

US 2017/0276226 A1 Sep. 28, 2017

(51) Int. Cl.
| | |
|---|---|
| B62M 9/00 | (2006.01) |
| B62M 9/10 | (2006.01) |
| B23P 15/14 | (2006.01) |
| B62M 9/121 | (2010.01) |
| B62M 9/131 | (2010.01) |
| F16G 13/06 | (2006.01) |
| F16H 55/06 | (2006.01) |
| F16H 55/30 | (2006.01) |

(52) U.S. Cl.
CPC .............. *F16H 55/06* (2013.01); *B23P 15/14* (2013.01); *B62M 9/10* (2013.01); *B62M 9/121* (2013.01); *B62M 9/131* (2013.01); *F16G 13/06* (2013.01); *F16H 55/30* (2013.01); *B62M 2009/005* (2013.01)

(58) Field of Classification Search
CPC ..... C22C 14/00; C22F 1/183; A63B 2209/00; A63B 53/047; D07B 2801/18
USPC .......................... 474/152; 420/420; 428/639
See application file for complete search history.

(56) References Cited

U.S. PATENT DOCUMENTS

| | | | | | |
|---|---|---|---|---|---|
| 2,754,203 | A | * | 7/1956 | Vordahl | .................. C22C 14/00 148/407 |
| 3,677,908 | A | * | 7/1972 | Sperl | ........................ C25D 5/44 205/159 |
| 5,580,669 | A | * | 12/1996 | Beers | ...................... C23C 14/16 427/405 |
| 5,698,050 | A | * | 12/1997 | El-Soudani | ............. C22C 14/00 148/669 |
| 5,849,112 | A | * | 12/1998 | El-Soudani | ............. C22C 14/00 148/421 |
| 5,885,375 | A | * | 3/1999 | Takemura | ............... C22C 14/00 148/421 |
| 6,200,685 | B1 | * | 3/2001 | Davidson | ............ A61F 2/30767 148/317 |
| 6,632,304 | B2 | * | 10/2003 | Oyama | .................. C22C 14/00 148/671 |

(Continued)

FOREIGN PATENT DOCUMENTS

| | | |
|---|---|---|
| CN | 102442836 | 5/2012 |
| CN | 104512518 | 4/2015 |
| JP | 04-007284 | 1/1992 |

*Primary Examiner* — Henry Y Liu
(74) *Attorney, Agent, or Firm* — Mori & Ward, LLP

(57) ABSTRACT

A slide component comprises a base member and a plated layer. The base member is made of a titanium alloy including beta phase of titanium. The base member includes a surface having a plurality of recesses. The plated layer is provided on the surface of the base member.

25 Claims, 24 Drawing Sheets

(56) References Cited

U.S. PATENT DOCUMENTS

| | | | | |
|---|---|---|---|---|
| 6,767,418 B1* | 7/2004 | Zhang | A61L 27/06 | 148/421 |
| 7,166,367 B2* | 1/2007 | Yashiki | B32B 15/017 | 181/244 |
| 7,214,143 B2* | 5/2007 | Deshmukh | A63B 53/0466 | 473/342 |
| 8,936,518 B2* | 1/2015 | Takechi | A63B 53/047 | 473/335 |
| 2005/0202271 A1* | 9/2005 | Yashiki | B32B 15/017 | 428/660 |
| 2006/0276785 A1* | 12/2006 | Asahara | A61B 18/1442 | 606/51 |
| 2007/0003780 A1* | 1/2007 | Varkey | H01B 7/2806 | 428/586 |
| 2010/0178996 A1* | 7/2010 | Chao | A63B 53/0466 | 473/342 |
| 2012/0029514 A1* | 2/2012 | Fairbourn | A61B 18/14 | 606/45 |
| 2012/0031765 A1* | 2/2012 | Curran | B05D 3/142 | 205/50 |
| 2012/0145287 A1* | 6/2012 | Kim | C22C 16/00 | 148/557 |
| 2012/0184390 A1* | 7/2012 | Takechi | A63B 53/047 | 473/324 |
| 2012/0305825 A1* | 12/2012 | Mori | C22C 14/00 | 251/368 |
| 2013/0078423 A1* | 3/2013 | Sutou | B29C 45/14311 | 428/141 |
| 2013/0209824 A1* | 8/2013 | Sun | B21B 3/00 | 428/544 |
| 2014/0038868 A1* | 2/2014 | Mori | F02F 3/10 | 508/300 |
| 2014/0305914 A1* | 10/2014 | Sutou | B29C 45/14311 | 219/121.17 |
| 2015/0093593 A1* | 4/2015 | Asakawa | C10M 107/38 | 428/639 |
| 2016/0108508 A1* | 4/2016 | Thomas | C22C 14/00 | 420/420 |
| 2016/0153525 A1* | 6/2016 | Eda | C22C 38/12 | 474/228 |
| 2016/0312614 A1* | 10/2016 | Chen | C25D 3/665 | |
| 2017/0016103 A1* | 1/2017 | Thomas | C22C 14/00 | |

\* cited by examiner

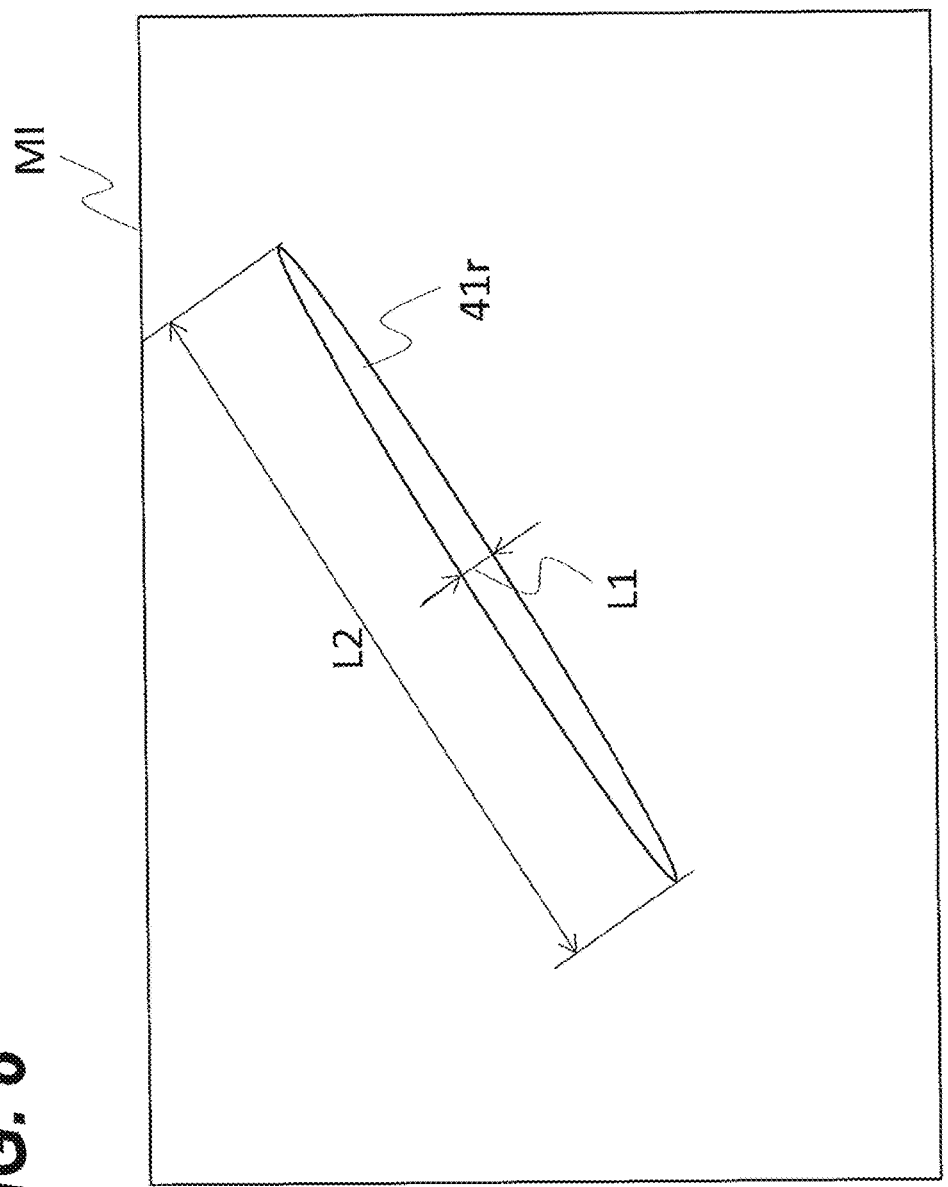
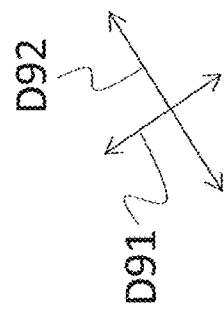
FIG. 8

SLIDE COMPONENT, BICYCLE COMPONENT, BICYCLE REAR SPROCKET, BICYCLE FRONT SPROCKET, BICYCLE CHAIN, AND METHOD OF MANUFACTURING SLIDE COMPONENT

BACKGROUND OF THE INVENTION

Field of the Invention

The present invention relates to a slide component, a bicycle component, a bicycle sprocket, a bicycle chain and method of manufacturing the slide component.

Discussion of the Background

A bicycle and a fishing tackle have a slide component engaged with another component. For example, a bicycle chain is engaged with a bicycle sprocket, and a fishing reel have gears engaged with one another. In addition, a bicycle has another type of slide component that slide on another component. For example, the bicycle chain slides on chain guides of a front derailleur during gear shifting.

SUMMARY OF THE INVENTION

In accordance with a first aspect of the present invention, a slide component comprises a base member and a plated layer. The base member is made of a titanium alloy including beta phase of titanium. The base member includes a surface having a plurality of recesses. The plated layer is provided on the surface of the base member.

With the slide component according to the first aspect, the titanium alloy is lightweight and has high strength. Although the titanium alloy has weak abrasion resistance, the base member made of the titanium alloy is protected by the plated layer. Plating material has typically low adhesion to the titanium alloy, but the plated layer can firmly adhere to the base member by the plurality of recesses due to anchor effect. Therefore, the slide component can be lightweight and have high strength with abrasion resistance.

In accordance with a second aspect of the present invention, the slide component according to the first aspect is configured so that the titanium alloy includes alpha phase of titanium.

With the slide component according to the second aspect, it is possible to effectively form the plurality of recesses on the surface of the base member.

In accordance with a third aspect of the present invention, the slide component according to the second aspect is configured so that the plurality of recesses are formed by partly removing the alpha phase of titanium.

With the slide component according to the third aspect, it is possible to effectively form the plurality of recesses on the surface of the base member.

In accordance with a fourth aspect of the present invention, the slide component according to the second or third aspect is configured so that the alpha phase of titanium is partly replaced with zinc.

With the slide component according to the fourth aspect, zinc can delay oxidization of titanium before the plated layer is provided on the base member, thus zinc can further improve the adhesion between the base member and the plated layer.

In accordance with a fifth aspect of the present invention, the slide component according to any one of the first to fourth aspects is configured so that the plated layer includes nickel.

With the slide component according to the fifth aspect, the plated layer including nickel can be corrosion-resistant and provide abrasion resistance to the slide component.

In accordance with a sixth aspect of the present invention, a bicycle component comprises the slide component according to any one of the first to fifth aspects.

With the bicycle component according to the sixth aspect, the slide component enhances abrasion resistance of the bicycle component.

In accordance with a seventh aspect of the present invention, a bicycle rear sprocket comprises the slide component according to any one of the first to fifth aspects.

With the bicycle rear sprocket according to the seventh aspect, the slide component enhances durability of the rear sprocket.

In accordance with an eighth aspect of the present invention, a bicycle front sprocket comprises the slide component according to any one of the first to fifth aspects.

With the bicycle front sprocket according to the eighth aspect, the slide component enhances abrasion resistance of the front sprocket.

In accordance with a ninth aspect of the present invention, the slide component according to any one of the first to fifth aspects, the bicycle component according to the sixth aspect, the bicycle rear sprocket according to the seventh aspect, and the bicycle front sprocket according to the eighth aspect are configured so that the plurality of recesses include at least one recess having a first length that ranges between 50 nanometers and 150 nanometers.

With the slide component according to the ninth aspect, the bicycle component according to the ninth aspect, the bicycle rear sprocket according to the ninth aspect, and the bicycle front sprocket according to the ninth aspect, the plated layer can firmly adhere to the base member by the plurality of recesses due to anchor effect.

In accordance with a tenth aspect of the present invention, the slide component according to any one of the first to fifth and ninth aspects, the bicycle component according to the sixth aspect, the bicycle rear sprocket according to the seventh aspect, and the bicycle front sprocket according to the eighth aspect are configured so that the at least one recess has a second length that ranges between 1 micrometer and 10 micrometers.

With the slide component according to the tenth aspect, the bicycle component according to the tenth aspect, the bicycle rear sprocket according to the tenth aspect, and the bicycle front sprocket according to the tenth aspect, the plated layer can firmly adhere to the base member by the plurality of recesses due to anchor effect.

In accordance with an eleventh aspect of the present invention, a slide component comprises a base member and a plated layer. The base member is made of a titanium alloy including alpha phase of titanium and beta phase of titanium. The base member comprises an internal portion and a border portion. The internal portion has a first density of the alpha phase of titanium. The border portion is provided on the internal layer portion. The border portion has a second density of the alpha phase of titanium. The second density is lower than the first density. The plated layer is provided on the border portion.

With the slide component according to the eleventh aspect, some of the alpha phase of titanium are removed compared to the internal portion, thus the plurality of recesses are provided in the border portion. Therefore, the plated layer can firmly adhere to the base member by the plurality of recesses due to anchor effect.

In accordance with a twelfth aspect of the present invention, the slide component according to the eleventh aspect is configured so that the border portion further includes zinc.

With the slide component according to the twelfth aspect, zinc can delay oxidization of titanium before the plated layer is provided on the border portion, thus zinc can further improve the adhesion between the base member and the plated layer.

In accordance with a thirteenth aspect of the present invention, the slide component according to the eleventh or twelfth aspect is configured so that the plated layer includes nickel.

With the slide component according to the thirteenth aspect the plated layer including nickel can be corrosion-resistant and provide abrasion resistance to the slide component.

In accordance with a fourteenth aspect of the present invention, a bicycle component comprises the slide component according to any one of the eleventh to thirteenth aspects.

With the bicycle component according to the fourteenth aspect, the slide component enhances abrasion resistance of the bicycle component.

In accordance with a fifteenth aspect of the present invention, a bicycle rear sprocket comprises the slide component according to any one of the eleventh to thirteenth aspects.

With the bicycle rear sprocket according to the fifteenth aspect, the slide component enhances abrasion resistance of the bicycle rear sprocket.

In accordance with a sixteenth aspect of the present invention, a bicycle front sprocket comprises the slide component according to any one of the eleventh to thirteenth aspects.

With the bicycle front sprocket according to the sixteenth aspect, the slide component enhances abrasion resistance of the bicycle front sprocket.

In accordance with a seventeenth aspect of the present invention, a slide component comprises a base member and a plated layer. The base member is made of a titanium alloy. The base member comprises an internal portion and a border portion. The internal portion includes alpha phase of titanium and beta phase of titanium. The border portion is provided on the internal portion. The border portion includes zinc and the beta phase of titanium. The plated layer is provided on the border portion.

With the slide component according to the seventeenth aspect, the titanium alloy is lightweight and has high strength. Although the titanium alloy typically has weak abrasion resistance, the base member made of the titanium alloy is protected by the plated layer. Plating material has typically low adhesion to the titanium alloy, but zinc can delay oxidization of titanium before the plated layer is provided on the border portion, thus zinc can improve the adhesion between the base member and the plated layer. Therefore, the slide component can be lightweight and have high strength with abrasion resistance.

In accordance with an eighteenth aspect of the present invention, a method of manufacturing a slide component comprises: providing a base member made of a titanium alloy including alpha phase of titanium and beta phase of titanium, the base member including a surface; removing at least part of the alpha phase of titanium at the surface of the base member to provide a border portion at the surface of the base member; plating the border portion to dispose a plated layer on the border portion.

With the slide component manufactured by the method according to the eighteenth aspect, some of the alpha phase of titanium are removed compared to the internal portion, thus the plurality of recesses are provided in the border portion. Therefore, the plated layer can firmly adhere to the base member by the plurality of recesses due to anchor effect.

In accordance with a nineteenth aspect of the present invention, the method according to the eighteenth aspect is configured so that the removing the at least part of the alpha phase of titanium includes replacing the at least part of the alpha phase of titanium at the surface of the base member with zinc.

With the slide component manufactured by the method according to the nineteenth aspect, zinc can delay oxidization of titanium before plating the border portion, thus zinc can further improve the adhesion between the base member and the plated layer.

In accordance with a twentieth aspect of the present invention, the method according to the eighteenth or nineteenth aspect is configured so that the removing the at least part of the alpha phase of titanium includes forming a plurality of recesses at the border portion.

With the slide component manufactured by the method according to the twentieth aspect, the titanium alloy is lightweight and has high strength. Although the titanium alloy typically has weak abrasion resistance, the base member made of the titanium alloy is protected by the plated layer. Plating material has typically low adhesion to the titanium alloy, but the plated layer can firmly adhere to the base member by the plurality of recesses due to anchor effect. Therefore, the slide component can be lightweight and have high strength with abrasion resistance.

In accordance with a twenty-first aspect of the present invention, the method according to any one of the eighteenth to twentieth aspects further comprises etching the base member to remove an oxide film on the base member before the removing the at least part of the alpha phase of titanium.

With the slide component manufactured by the method according to the twenty-first aspect, the oxide film on the base member is removed to enhance adhesion of the plated layer to the base member.

In accordance with a twenty-second aspect of the present invention, the method according to the twenty-first aspect further comprises desmutting the base member after the etching the base member.

With the slide component manufactured by the method according to the twenty-second aspect, smut on the base member is removed to enhance adhesion of the plated layer to the base member.

In accordance with a twenty-third aspect of the present invention, a slide component comprises a base member and a plated layer. The base member is made of a titanium alloy including alpha phase of titanium and beta phase of titanium. The base member includes a surface having a plurality of recesses formed by partly removing the alpha phase of titanium. The plated layer is provided on the surface of the base member.

With the slide component according to the twenty-third aspect, the titanium alloy is lightweight and has high strength. Although the titanium alloy typically has weak abrasion resistance, the base member made of the titanium alloy is protected by the plated layer. Plating material has typically low adhesion to the titanium alloy, but the plated layer can firmly adhere to the base member by the plurality of recesses due to anchor effect. Therefore, the slide component can be lightweight and have high strength with abrasion resistance.

In accordance with a twenty-fourth aspect of the present invention, the slide component according to the twenty-third aspect is configured so that the plurality of recesses are formed by partly replacing the alpha phase of titanium with zinc.

With the slide component according to the twenty-fourth aspect, zinc can delay oxidization of titanium before the plated layer is provided on the base member, thus zinc can further improve the adhesion between the base member and the plated layer.

In accordance with a twenty-fifth aspect of the present invention, a slide component comprises a base member and a plated layer. The base member is made of a titanium alloy including alpha phase of titanium and beta phase of titanium. The base member comprises an internal portion and a border portion. The internal layer portion has a first density of the alpha phase of titanium. The border portion is provided on the internal portion. The border portion has a second density of the alpha phase of titanium. The second density is lower than the first density. The plated layer is provided on the border portion. The slide component is manufactured with a method comprising: providing the base member, the base member including a surface; removing at least part of the alpha phase of titanium at the surface of the base member to provide the border portion at the surface of the base member and the internal portion inside the border portion; and plating the border portion to dispose the plated layer.

With the slide component according to the twenty-fifth aspect, some of the alpha phase of titanium are removed compared to the internal portion, thus a plurality of recesses are provided in the border portion. Therefore, the plated layer can firmly adhere to the base member by the plurality of recesses due to anchor effect.

In accordance with a twenty-sixth aspect of the present invention, a slide component comprises a base member and a plated layer. The base member is made of a titanium alloy. The base member includes an internal portion and a border portion. The internal portion includes alpha phase of titanium and beta phase of titanium. The border portion is provided on the internal portion. The border portion includes zinc and the beta phase of titanium. The plated layer is provided on the border portion. The slide component is manufactured with a method comprising: providing the base member made of the titanium alloy including the alpha phase of titanium and the beta phase of titanium, the base member including a surface; replacing at least part of the alpha phase of titanium at the surface of the base member with zinc to provide the border portion at the surface of the base member and the internal portion inside the border portion; and plating the border portion to dispose the plated layer.

With the slide component according to the twenty-sixth aspect, the titanium alloy is lightweight and has high strength. Although the titanium alloy typically has weak abrasion resistance, the base member made of the titanium alloy is protected by the plated layer. Plating material has typically low adhesion to the titanium alloy, but zinc can delay oxidization of titanium before the plated layer is provided on the border portion, thus zinc can improve the adhesion between the base member and the plated layer. Therefore, the slide component can be lightweight and have high strength with abrasion resistance.

In accordance with a twenty-seventh aspect of the present invention, a slide component comprises a base member and a plated layer. The base member is made of a titanium alloy including alpha phase of titanium and beta phase of titanium. The base member includes a surface. The plated layer is provided on the surface of the base member. The plated layer includes a first metallic material different from titanium. The slide component comprises a second metallic material positioned between the base member and the plated layer. The second metallic material is different from titanium and the first metallic material.

With the slide component according to the twenty-seventh aspect, the titanium alloy is lightweight and has high strength. Although the titanium alloy typically has weak abrasion resistance, the base member made of the titanium alloy is protected by the plated layer. Plating material has typically low adhesion to the titanium alloy, but the first material can be selected to improve abrasion resistance of the slide component and the second material can be selected to improve adhesion between the base member and the plated layer. Therefore, the slide component can be lightweight and have high strength with abrasion resistance.

In accordance with a twenty-eighth aspect of the present invention, the slide component according to the twenty-seventh aspect is configured so that the surface of the base member has a plurality of recesses. The second metallic material is positioned in at least one of the plurality of recesses.

With the slide component according to the twenty-eighth aspect, the plurality of recesses enhances the adhesion of the plated layer to the base member due to anchor effect.

In accordance with a twenty-ninth aspect of the present invention, the slide component according to the twenty-seventh or twenty-eighth aspect is configured so that the first metallic material is nickel.

With the slide component according to twenty-ninth aspect, the plated layer including nickel can be corrosion-resistant and provide abrasion resistance to the slide component.

In accordance with a thirtieth aspect of the present invention, the slide component according to any one of the twenty-seventh to twenty-ninth aspect is configured so that the second metallic material is zinc.

With the slide component according to the thirtieth aspect, zinc can delay oxidization of titanium before the plated layer is provided on the border portion, thus zinc can further improve the adhesion between the base member and the plated layer.

In accordance with a thirty-first aspect of the present invention, a slide component comprises a base member and an abrasion-resistant layer. The base member is made of one of a titanium alloy and an iron alloy. The abrasion-resistant layer is made of a material selected from a group consisting of titanium carbide (TiC), titanium carbonitride (TiCN) and titanium nitride (TiN).

With the slide component according to the thirty-first aspect, it is possible to effectively enhance durability of the slide component.

In accordance with a thirty-second aspect of the present invention, a bicycle sprocket comprises the slide component according to the thirty-first aspect.

With the bicycle sprocket according to thirty-second aspect, the slide component enhances durability of the bicycle sprocket.

In accordance with a thirty-third aspect of the present invention, a bicycle chain comprises the slide component according to the thirty-first aspect.

With the bicycle chain according to the thirty-third aspect, the slide component enhances durability of the bicycle chain. In addition, the slide component can decrease sliding friction between the bicycle chain and the bicycle sprocket to improve rotation transmission efficiency.

In accordance with a thirty-fourth aspect of the present invention, at least one of a pin member and a roller member of a bicycle chain comprises the slide component according to the thirty-first aspect.

With the pin member and/or the roller member according to the thirty-fourth aspect, the slide component enhances durability of the at least one of the pin member and the roller member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 8 illustrates an exemplary electron microscopy image.

DESCRIPTION OF THE EMBODIMENTS

Figure 1:
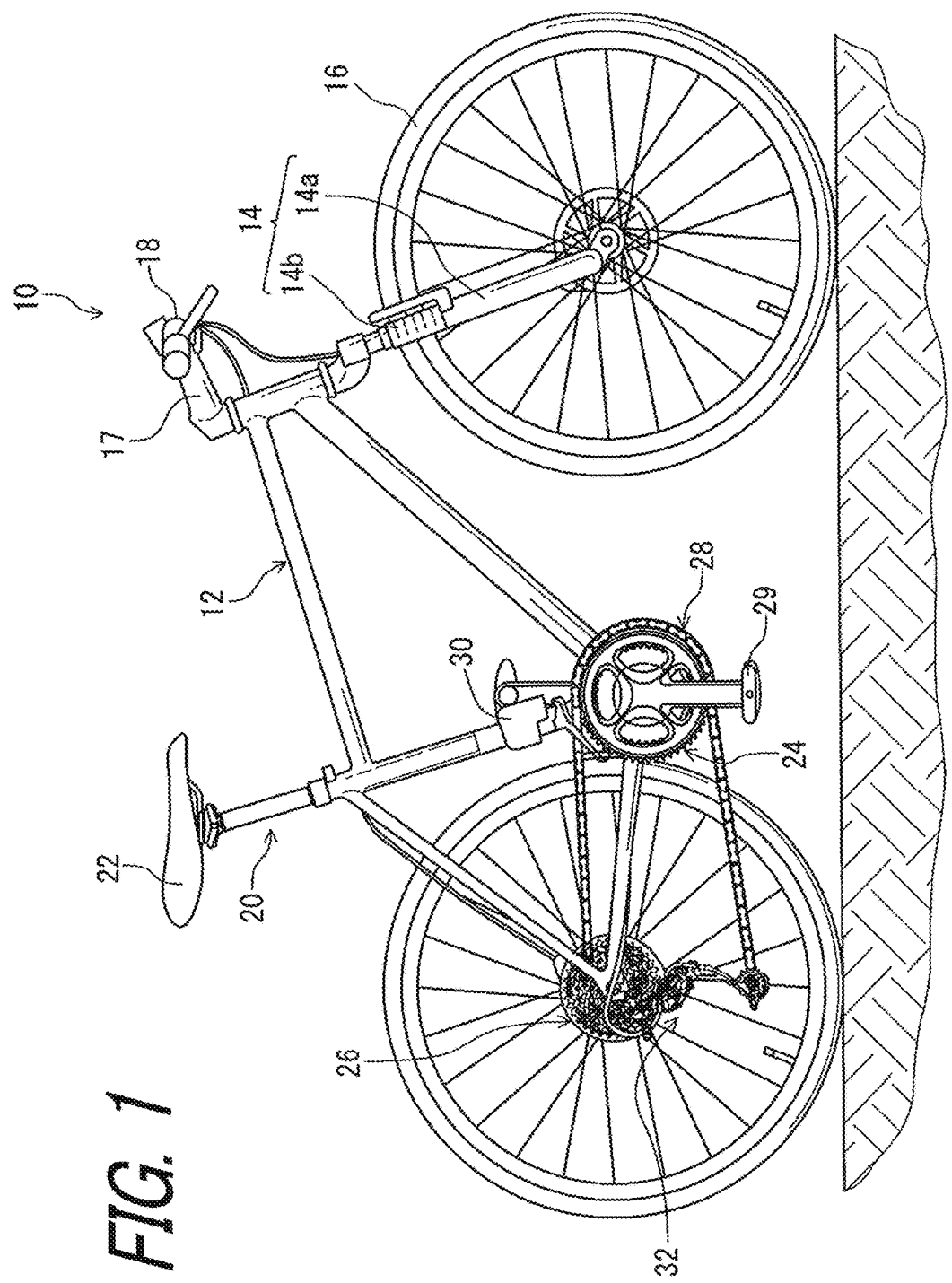
FIG. 1 a side elevational view of a bicycle in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 in accordance with a first embodiment comprises a bicycle frame 12, a front fork assembly 14, a front wheel 16, a handlebar 18, a seatpost assembly 20, a saddle 22, a crank assembly 24, a rear sprocket assembly 26, a bicycle chain 28, and a bicycle pedal 29. The front fork assembly 14 is rotatably mounted to the bicycle frame 12. The front fork assembly 14 includes a front fork body 14a and a fork suspension 14b in this embodiment. The front wheel 16 is rotatably mounted to the front fork body 14a. The fork suspension 14b absorbs vibration that is applied from the front wheel 16 to the front fork body 14a while the bicycle 10 runs, for example, on a rugged trail. The handlebar 18 is attached to the front fork assembly 14 via a stem 17. The seatpost assembly 20 is mounted to the bicycle frame 12. The saddle 22 is attached to the seatpost assembly 20. The crank assembly 24 is rotatably mounted to the bicycle frame 12. The rear sprocket assembly 26 is rotatably mounted to the bicycle frame 12. The bicycle chain 28 is engaged with the crank assembly 24 and the rear sprocket assembly 26. The bicycle 10 may further comprise a front derailleur assembly 30 and a rear derailleur assembly 32 to change a speed stage of the bicycle 10.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle 22 of the bicycle 10 with facing the handlebar 18. Accordingly, these terms, as utilized to describe the crank assembly 24, the rear sprocket assembly 26, the bicycle chain 28, the front derailleur assembly 30, or the rear derailleur assembly 32 should be interpreted relative to the bicycle equipped with the crank assembly 24, the rear sprocket assembly 26, the bicycle chain 28, the front derailleur assembly 30, or the rear derailleur assembly 32 as used in an upright riding position on a horizontal surface.

In the present application, bicycle components are referred to as components that can be a part of the bicycle 10. For example, each of the bicycle frame 12, the fork suspension 14b, the seatpost assembly 20, the crank assembly 24, the rear sprocket assembly 26, the bicycle chain 28, the front derailleur assembly 30, and the rear derailleur assembly 32 can also be referred to as bicycle components 12, 14b, 20, 24, 26, 28, 30, 32, respectively. In addition, each of a component of the fork suspension 14b, a component of the seatpost assembly 20, a component of the crank assembly 24, a component of the rear sprocket assembly 26, a component of the bicycle chain 28, a component of the front derailleur assembly 30, and a component of the rear derailleur assembly 32 can also be referred to as bicycle components. In the present application, a rear sprocket and a front sprocket can also be referred to as a bicycle sprocket. A bicycle sprocket can also be referred to as a bicycle component.

Figure 2:
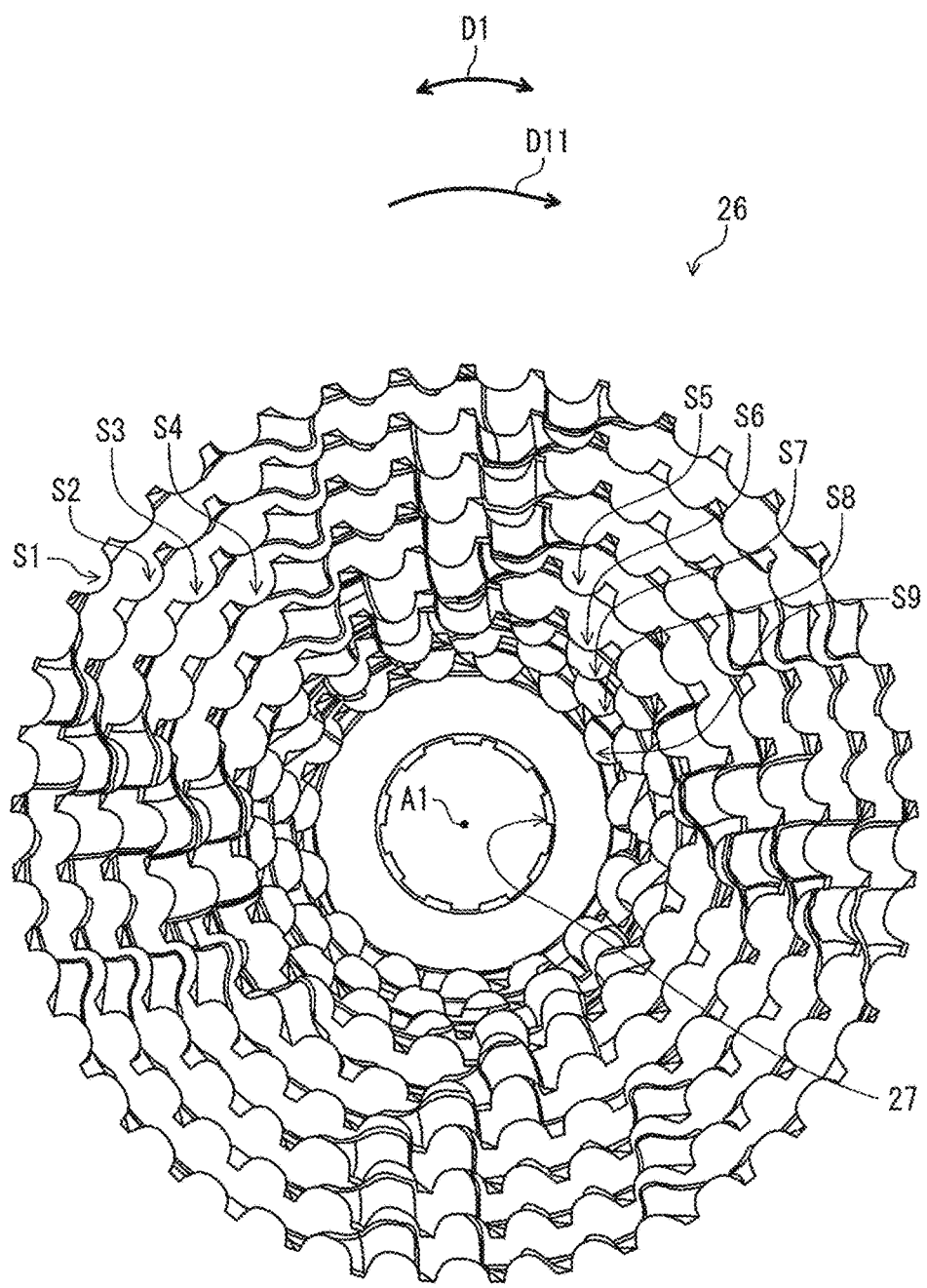
FIG. 2 is a front elevational view of a rear sprocket assembly.

Referring to FIG. 2, the rear sprocket assembly 26 in accordance with the first embodiment includes a plurality of the rear sprockets S1 to S9. The rear sprocket assembly 26 is configured to engage with the bicycle chain 28. In this embodiment, the rear sprocket assembly 26 includes nine rear sprockets S1 to S9. The rear sprocket assembly 26 has a rotational center axis A1. The rear sprocket assembly 26 is configured to be rotatable about the rotational center axis A1 in a driving rotational direction D11 during the pedaling. The driving rotational direction D11 is defined along a circumferential direction D1 of the rear sprocket assembly 26.

Figure 3:
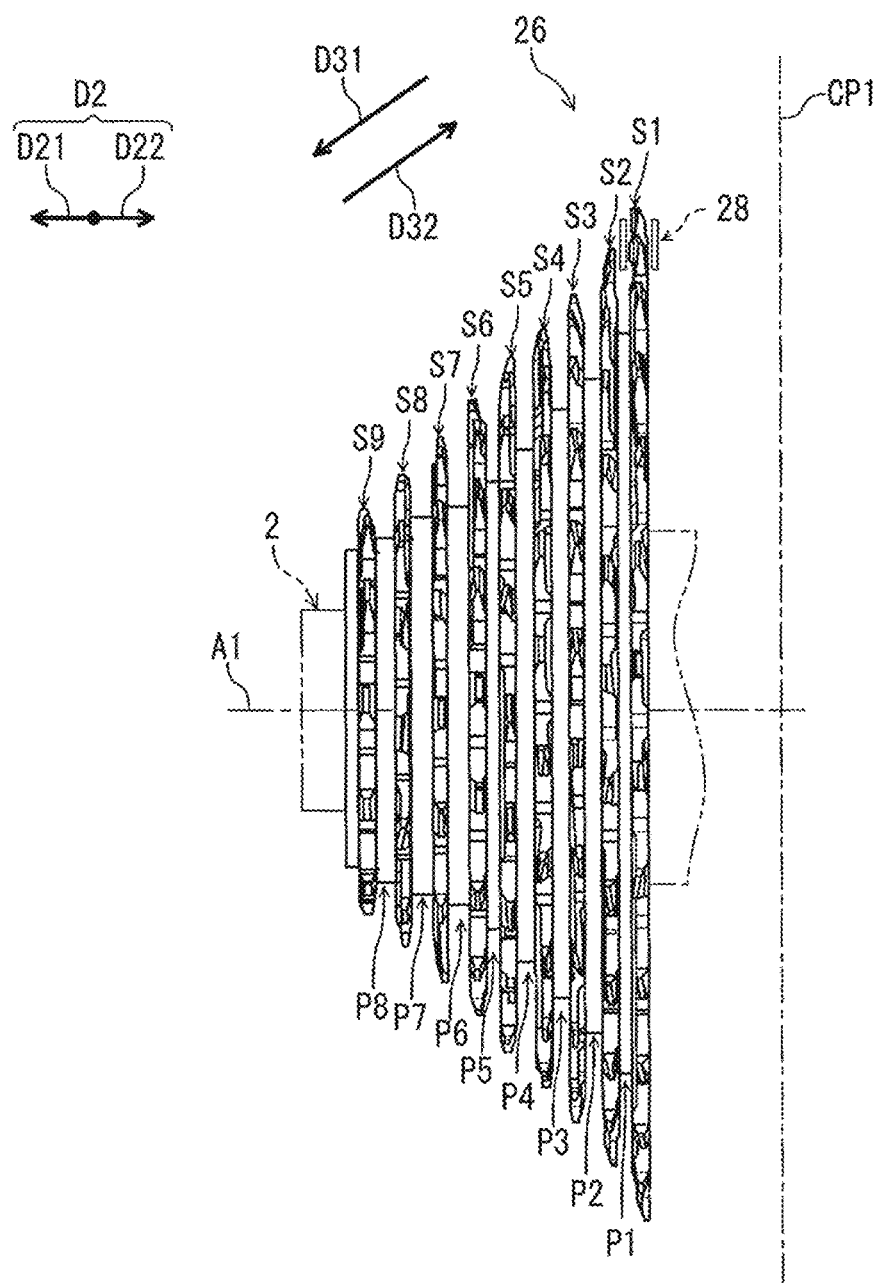
FIG. 3 is a side elevational view of the rear sprocket assembly.

As shown in FIG. 2, the rear sprocket assembly 26 further includes a rear hub engagement structure 27 configured to engage with a bicycle hub assembly 2 (FIG. 3). As shown in FIG. 3, the rear sprockets S1 to S9 are arranged in an axial direction D2 parallel to the rotational center axis A1. The rear sprockets S1 to S9 are spaced apart from each other in the axial direction D2. The rear sprocket assembly 26 includes spacers P1 to P8. Each of the spacers P1 to P8 is arranged between adjacent two sprockets of the rear sprockets S1 to S9.

The rear sprocket S1 has an outer diameter which is largest in the rear sprockets S1 to S9. The rear sprocket S9 has an outer diameter which is smallest in the rear sprockets S1 to S9. The rear sprocket S1 is closer to a bicycle center plane CP1 of the bicycle frame 12 than the rear sprocket S9 in a state where the rear sprocket assembly 26 is mounted to the bicycle hub assembly 2. Upshifting occurs when the bicycle chain 28 is shifted by the rear derailleur assembly 32 from a larger sprocket to a neighboring smaller sprocket in an upshifting direction D31. Downshifting occurs when the bicycle chain 28 is shifted by the rear derailleur assembly 32 from a small sprocket to a neighboring larger sprocket in a downshifting direction D32.

The axial direction D2 includes an outward axial direction D21 and an inward axial direction D22. The inward axial direction D22 is opposite to the outward axial direction D21. The upshifting direction D31 is defined along the outward axial direction D21. The downshifting direction D32 is defined along the inward axial direction D22.

Figure 4:
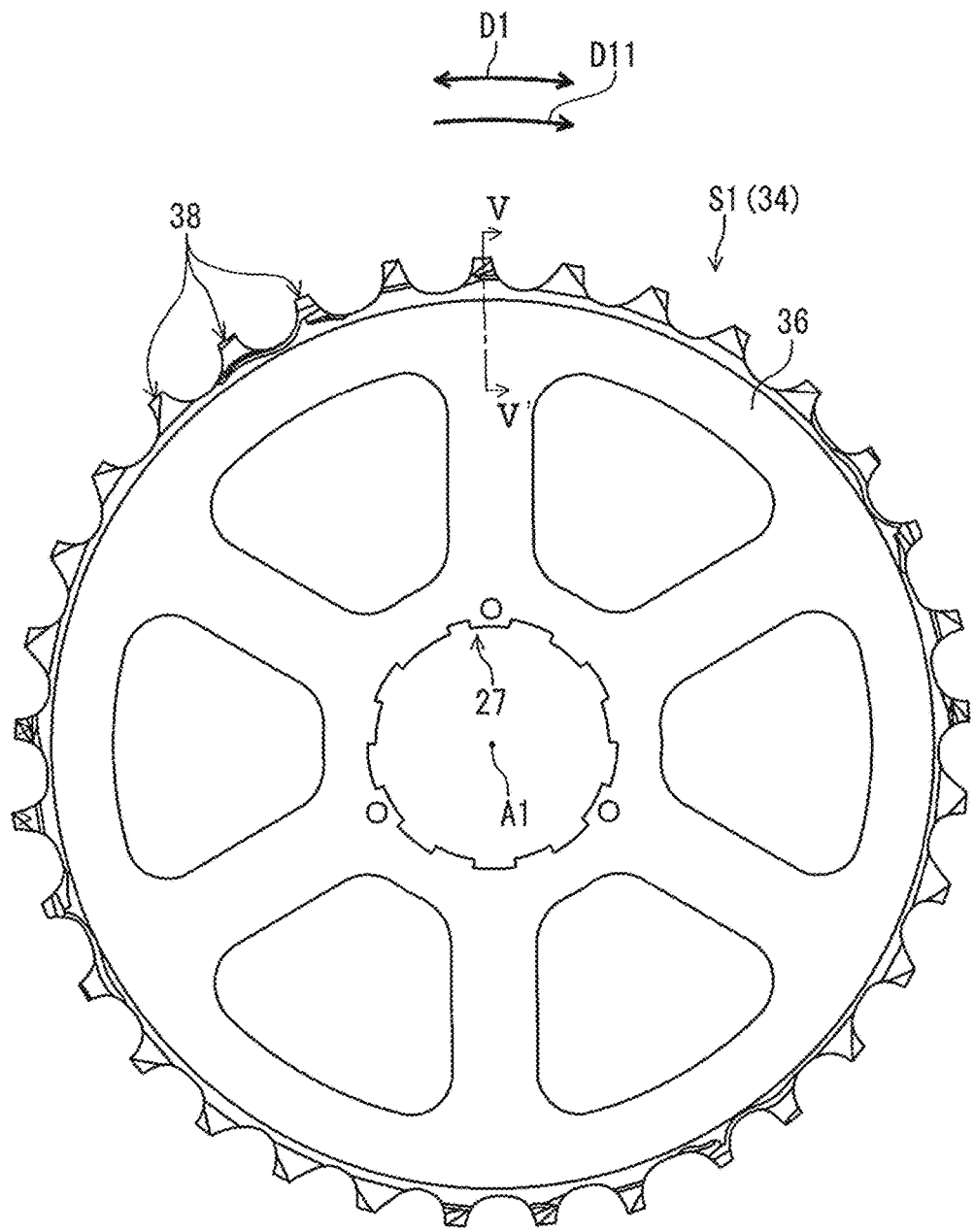
FIG. 4 is a front elevational view of a rear sprocket.

FIG. 4 illustrates the rear sprocket S1 as an example of the rear sprockets S1 to S9. The rear sprocket S1 is one example of the bicycle component. As shown in FIG. 4, the rear sprocket S1 has the rotational center axis A1. The rear sprocket S1 is configured to be rotatable about the rotational center axis A1. The rear sprocket S1 includes a rear sprocket body 36 and a plurality of rear sprocket teeth 38. The rear sprocket body 36 is configured to be rotatable about the rotational center axis A1. The rear sprocket body 36 has an annular shape. The rear sprocket teeth 38 extend radially outward from an outer periphery of the rear sprocket body 36. The rear sprocket teeth 38 are configured to engage with the bicycle chain 28 while the bicycle chain 28 is engaged with the rear sprocket S1. The other rear sprockets S2 to S9 have similar shapes to the rear sprocket S1 except for diameters of the annular shapes.

Figure 5:
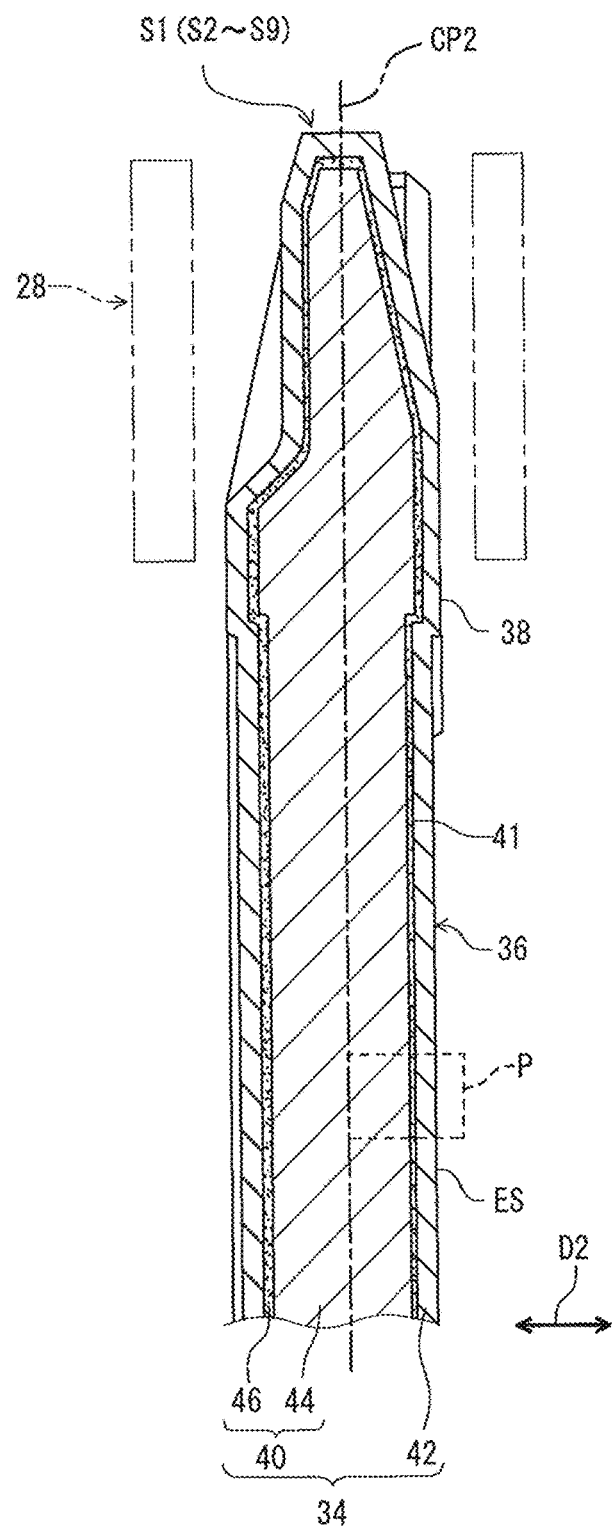
FIG. 5 is a partial cross-sectional view of the rear sprocket taken along line V-V' illustrated in FIG. 4.

In this embodiment, the rear sprockets S1 to S9 have substantially the same internal structure. The rear sprockets (i.e. one of S1 to S9) may comprise a slide component 34. For example, the rear sprocket teeth 38 can be the slide component 34. In other words, the bicycle component (i.e. one of S1 to S9) comprises the slide component 34. The bicycle sprocket (i.e. one of S1 to S9) comprises the slide component 34. As shown in FIG. 5, the slide component 34 comprises a base member 40, and a plated layer 42. The base member 40 comprises an internal portion 44 and a border portion 46. The border portion 46 is provided on the internal portion 44. The base member 40 is made of a titanium alloy. The titanium alloy includes alpha phase of titanium, and may further include beta phase of titanium. Specifically, the internal portion 44 includes the alpha phase of titanium and the beta phase of titanium. The internal portion 44 has a first density of the alpha phase of titanium. The border portion 46 may include the beta phase of titanium. The border portion 46 may include alpha phase of titanium such that the border portion 46 has a second density of the alpha phase of titanium. The second density is lower than the first density. The border portion 46 may further include zinc. The border portion 46 includes a surface 41, which means the base member 40 includes the surface 41. The plated layer 42 is provided on the surface 41 of the base member 40, that is, the plated layer 42 is provided on the border portion 46. The plated layer 42 has abrasion resistance and can effectively prevent the base member 40 from being worn. The plated layer 42 includes a first metallic material different from titanium. Preferably, the plated layer 42 includes nickel, because a nickel plated layer is corrosion-resistant and provides abrasion resistance to the slide component 34. In this case, the first metallic material is nickel. However, the plated layer 42 may include nickel (Ni), copper (Cu), lead (Pb), silver (Ag), platinum (Pt), gold (Au), iron (Fe), or tin (Sn). The slide component 34 comprises a second metallic material positioned between the base member 40 and the plated layer 42. The second metallic material is different from titanium and the first metallic material. In this case, the second metallic material is zinc.

Figure 6:
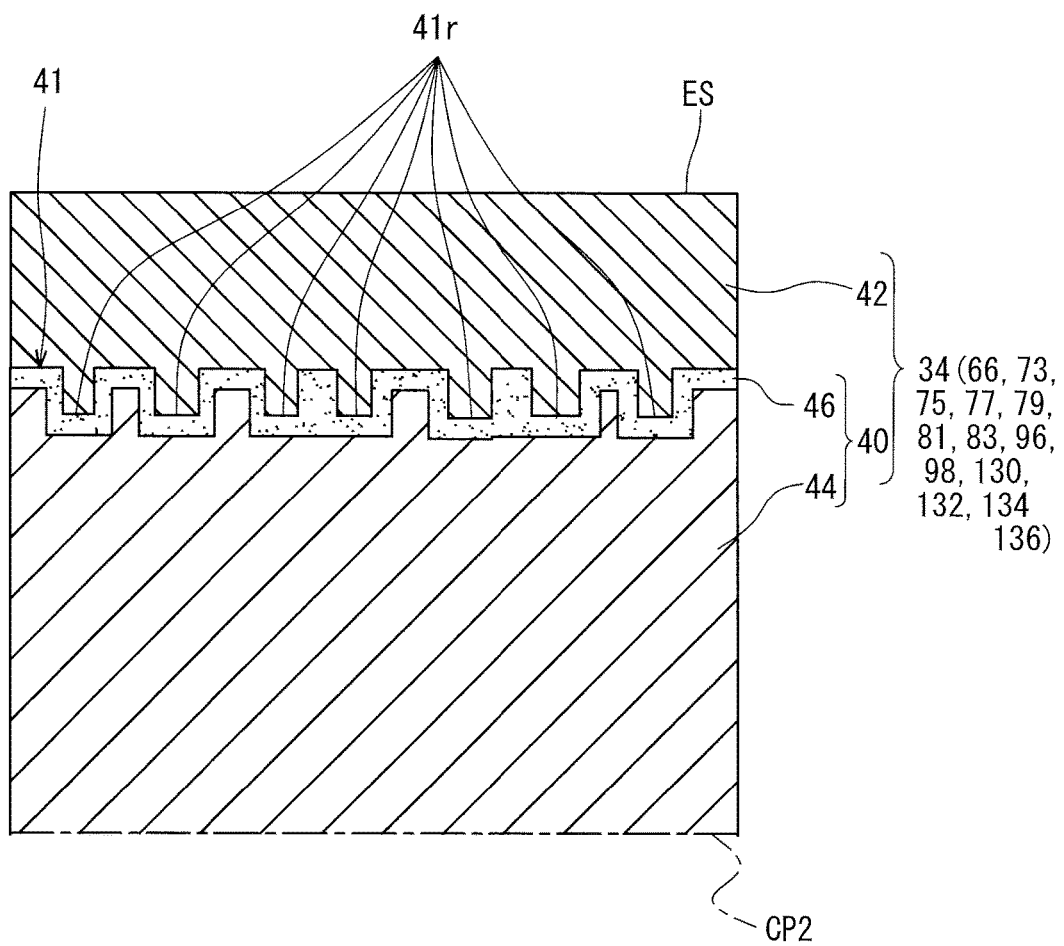
FIG. 6 is an enlarged exemplary view of a part P of the rear sprocket illustrated in FIG. 5.
Figure 7:
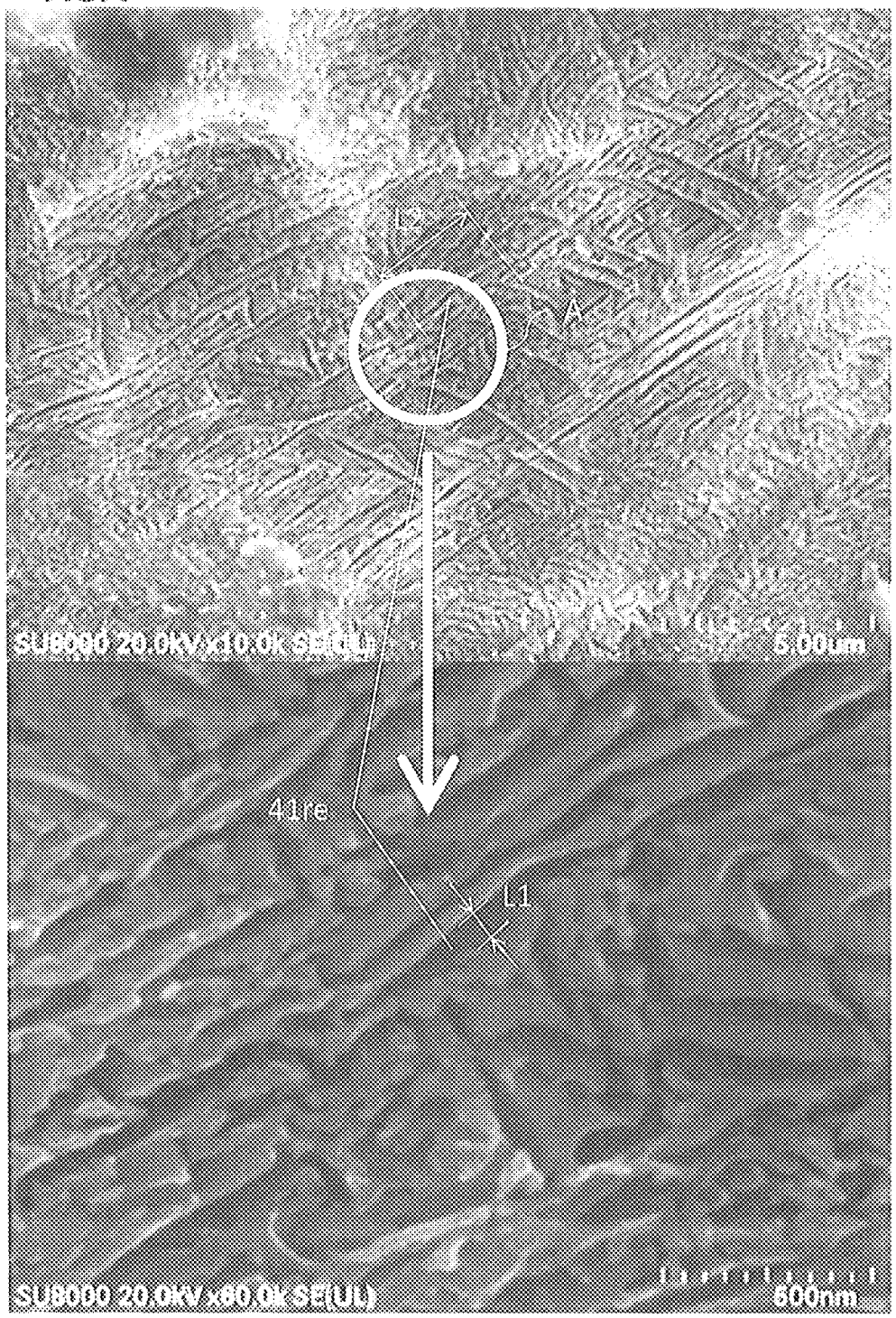
FIG. 7 shows electron microscopy images of a surface of a base member.

FIG. 6 illustrates an exemplary shape of the surface 41 of the base member 40 and an exemplary shape of the border portion 46. As shown in FIG. 6, the surface 41 of the base member 40 has a plurality of recesses 41r. FIG. 7 shows two electron microscopy images of the surface 41 without coverage of the plated layer 42. The electron microscopy images are captured before the base member 40 is plated. In FIG. 7, a lower image of the electron microscopy images shows an enlarged image of an area A of an upper image of the electron microscopy images. Each of the electron microscopy images includes scales at a bottom-right corner thereof. Magnified objects in the lower image appear 6 times as large as those in the upper image do.

In FIG. 7, a reference sign 41re specifies one of the plurality of recesses 41r. As shown in the lower image, a recess 41re has a first length L1 that ranges between 50 nanometers and 150 nanometers. Specifically, the first length L1 is approximately 70 nanometers. As shown in the upper image, the recess 41re has a second length L2 that ranges between 1 micrometer and 10 micrometers. Specifically, the second length L2 is approximately 1.5 micrometers. Accordingly, the plurality of the recesses 41r includes at least one recess 41re having the first length L1 that ranges between 50 nanometers and 150 nanometers and the second length L2 between 1 micrometer and 10 micrometers. A minimum interatomic distance of alpha phase of titanium is 2.951 angstroms. Accordingly, the first length L1 is at least 160 times as long as the minimum interatomic distance of alpha phase of titanium. That is, the plurality of recesses 41r is much larger than interatomic spaces of titanium.

The first length L1 and the second length L2 can be calculated, for example, by the following procedure. At a first step, as shown in FIG. 6, the slide component 34 is cut into an appropriate size. For example, as for the part P in FIG. 5, the slide component 34 can be cut along a core plane CP2 that is perpendicular to the rotational center axis A1. At a second step, if necessary, the plated layer 42 is removed from the slide component 34 that is cut at the first step to provide a specimen of the base member 40. The plated layer 42 can be removed for example by using separating material appropriate to material of the plated layer 42. At a third step, the specimen of the base member 40 is placed on a flat microscope stage of an electron microscope such that the bottom surface of the base member 40 faces the flat microscope stage. At a fourth step, the electron microscopy image is captured. FIG. 8 illustrates an exemplary electron microscopy image MI. As shown in FIG. 8, a second length L2 of a recess 41$r$ is a longest length among lengths of the recess 41$r$ which are measured in all directions in the electron microscopy image MI. The direction in which the second length L2 is measured is referred to as a longitudinal direction D92 of the recess 41$r$. A first length L1 of the recess 41$r$ is a longest length among lengths of the recess 41$r$ which are measured in a lateral direction D91 perpendicular to the longitudinal direction D92 in the electron microscopy image MI.

The method for manufacturing the slide component 34 in accordance with the first embodiment of the present invention may comprise:

providing the base member 40 made of the titanium alloy including the alpha phase of titanium and the beta phase of titanium, the base member 40 including the surface 41;

removing at least part of the alpha phase of titanium at the surface 41 of the base member 40 to provide the border portion 46 at the surface 41 of the base member 40 and the internal portion 44 inside the border portion 46; and plating the border portion 46 to dispose the plated layer 42 on the border portion 46.

The removing at least part of the alpha phase of titanium includes forming the plurality of recesses 41$r$ at the border portion 46. The removing at least part of the alpha phase of titanium includes replacing the at least part of the alpha phase of titanium at the surface 41 of the base member 40 with zinc. The method further comprises etching the base member 40 to remove an oxide film on the base member 40 before the removing the at least part of the alpha phase of titanium. The method further comprises desmutting the base member 40 after the etching the base member 40.

Alternatively, the method for manufacturing the slide component 34 in accordance with the first embodiment of the present invention may comprise:

providing the base member 40 made of the titanium alloy including the alpha phase of titanium and the beta phase of titanium, the base member 40 including the surface 41;

replacing at least part of the alpha phase of titanium at the surface 41 of the base member 40 with zinc to provide the border portion 46 at the surface 41 of the base member 40 and the internal portion 44 inside the border portion 46; and plating the border portion 46 to dispose the plated layer 42 on the border portion 46.

Figure 9:
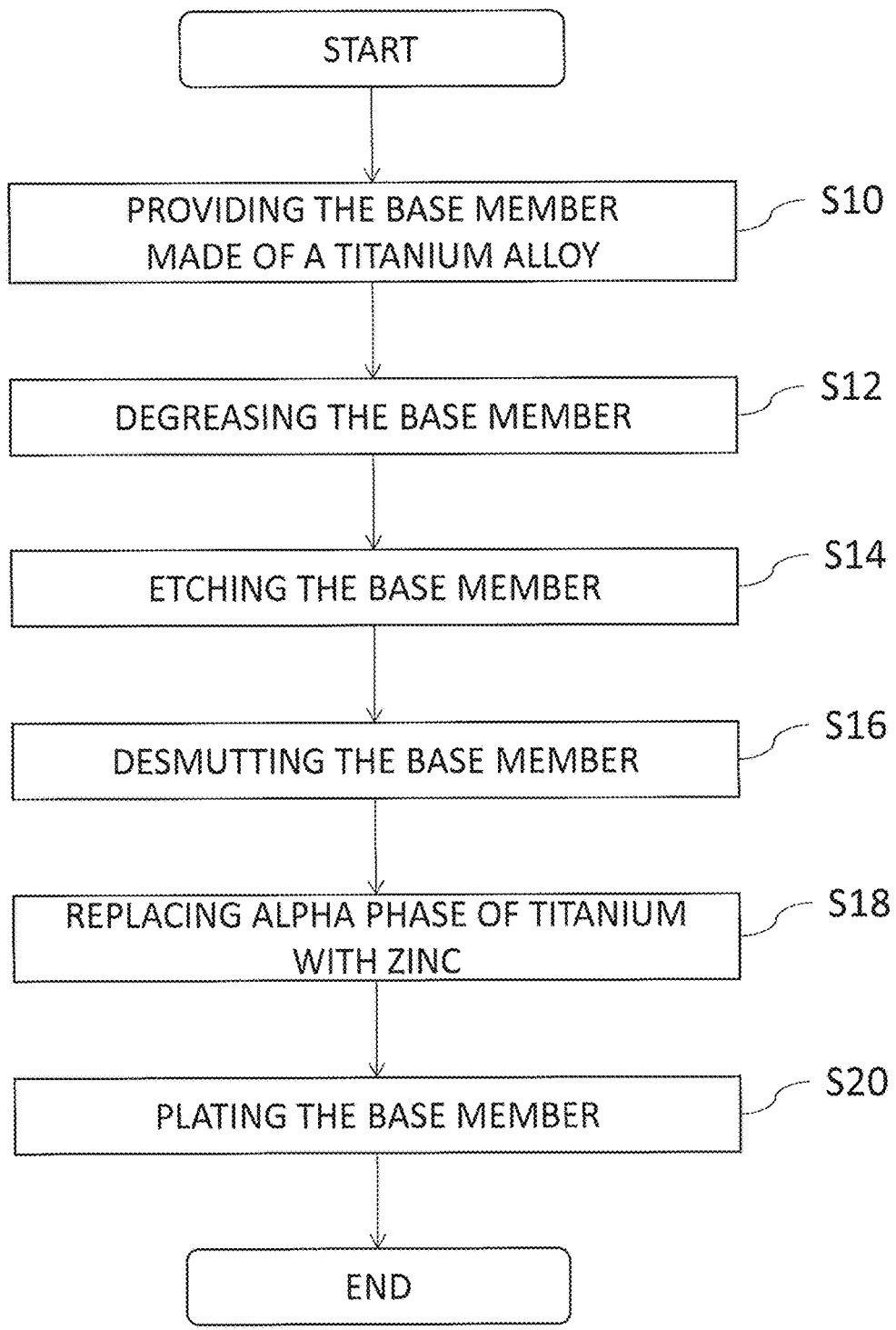
FIG. 9 is a flow chart of a method for manufacturing a slide component in accordance with the first embodiment of the present invention.

FIG. 9 illustrates a flow chart of processes of the above manufacturing method. In the step S10, the base member 40 is provided. Material of the base member 40 is preferably an alpha beta titanium alloy, such as Ti-15V-3Al-3Sn-3Cr, which includes the alpha phase of titanium and the beta phase of titanium. The titanium alloy is usually oxidized naturally, thus the material of the base member 40 may include an oxide film on the titanium alloy.

In the step S12, the provided base member 40 is degreased to remove dirt such as grease on the provided base member 40. For example, the provided base member 40 is immersed in a sodium hydroxide aqueous solution (NaOH) substantially at 60 degrees Celsius for 3 minutes to degrease the provided base member 40. In the step S14, the degreased base member 40 is etched to remove the oxide film on the base member 40. For example, the degreased base member 40 is immersed in an acidic ammonium fluoride aqueous solution (NH$_4$F.HF) substantially at 37 degrees Celsius for 2 minutes to etch the degreased base member 40. After the etching, smut including alloying elements is provided on the base member 40. In the step S16, the etched base member 40 is desmutted to remove the smut on the base member 40. For example, the etched base member 40 is immersed in a mixed aqueous solution of a hydrofluoric acid (HF), a nitric acid (HNO$_3$), and a sulfuric acid (H$_2$SO$_4$) at room temperature substantially for 3 minutes to desmut the etched base member 40.

In the step S18, the desmutted base member 40 is immersed in a mixed aqueous solution of an ammonium hydrogen difluoride (NH$_4$F.HF) and a zinc salt substantially at 25 degrees Celsius. During the immersion in the mixed aqueous solution of the ammonium hydrogen difluoride and the zinc salt, the alpha phase of titanium is partly replaced with zinc. The alpha phase of titanium is replaced with zinc at the surface 41 of the base member 40. Accordingly, at least part of the alpha phase of titanium at the surface 41 of the base member 40 is removed. That is, the alpha phase of titanium is partly removed. Replacing the alpha phase of titanium with zinc changes an atomic arrangement at the surface 41 to form the plurality of recesses 41$r$. In other words, the plurality of recesses 41$r$ are formed by partly replacing the alpha phase of titanium with zinc. That is, the plurality of recesses 41$r$ are formed by partly removing the alpha phase of titanium. The border portion 46 is equivalent to a portion of the desmutted base member 40 in which the alpha phase of titanium is partly replaced. Accordingly, the border portion 46 includes the surface 41 having the plurality of recesses 41$r$. The internal portion 44 is the rest of the desmutted base member 40 other than the border portion 46. Accordingly, by replacing the alpha phase of titanium with zinc, the border portion 46 is provided at the surface 41 of the base member 40 and the internal portion 44 is provided inside the border portion 46. The alpha phase of titanium is partly removed at the border portion 46, so that the second density of the alpha phase of titanium in the border portion 46 is lower than the first density of the alpha phase of titanium in the internal portion 44. For convenience of the following description, the base member 40 with the plurality of recesses 41$r$ is referred to as a recessed base member 40.

In the step S20 in FIG. 9, the recessed base member 40 is plated with a plating material, such as nickel (Ni), copper (Cu), lead (Pb), silver (Ag), platinum (Pt), gold (Au), iron (Fe), or tin (Sn) to dispose the plated layer 42 on the border portion 46. Preferably, the recessed base member 40 is plated with nickel for the purpose of effectively improving abrasion resistance.

The plating material has typically low adhesion to the titanium alloy, but the plurality of recesses 41$r$ of the base member 40 enables the plated layer 42 to firmly adhere to the base member 40 due to anchor effect. The plated layer 42 is abrasion-resistant and can prevent the base member 40 from being worn so that the slide component 34 enhances durability of the rear sprockets S1 to S9.

Figure 10:
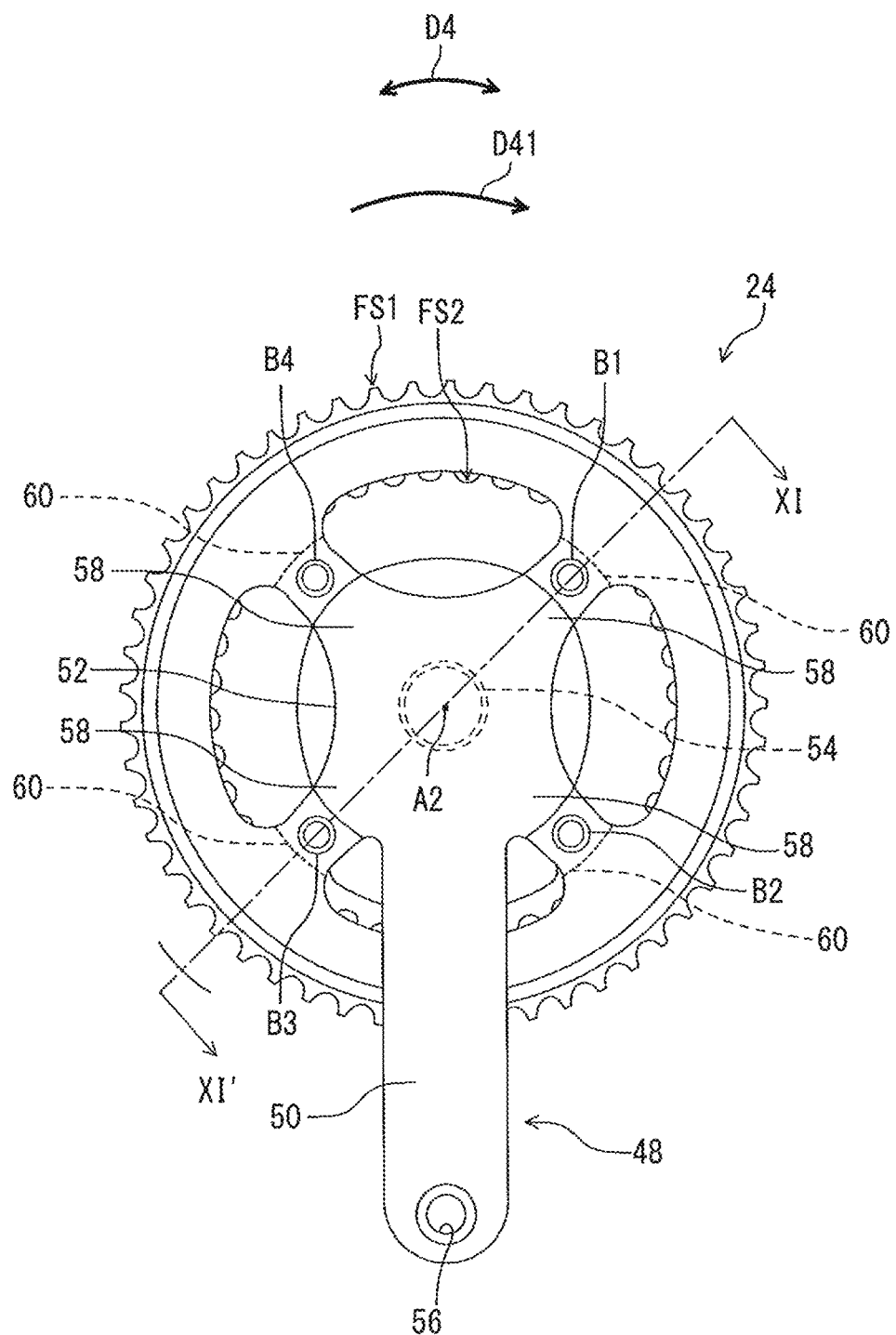
FIG. 10 is a front elevational view of a front sprocket assembly.

As shown in FIG. 10, the crank assembly 24 in accordance with the first embodiment includes a crank portion 48 and a plurality of the front sprockets. The crank assembly 24 is configured to engage with a bicycle chain 28. In this embodiment, the crank assembly 24 includes a first front sprocket FS1 and a second front sprocket FS2. The crank assembly 24 has a rotational center axis A2. The crank assembly 24 is configured to be rotatable about the rotational center axis A2 in a driving rotational direction D41 during the pedaling. The driving rotational direction D41 is defined along a circumferential direction D4 of the crank assembly 24.

Figure 11:
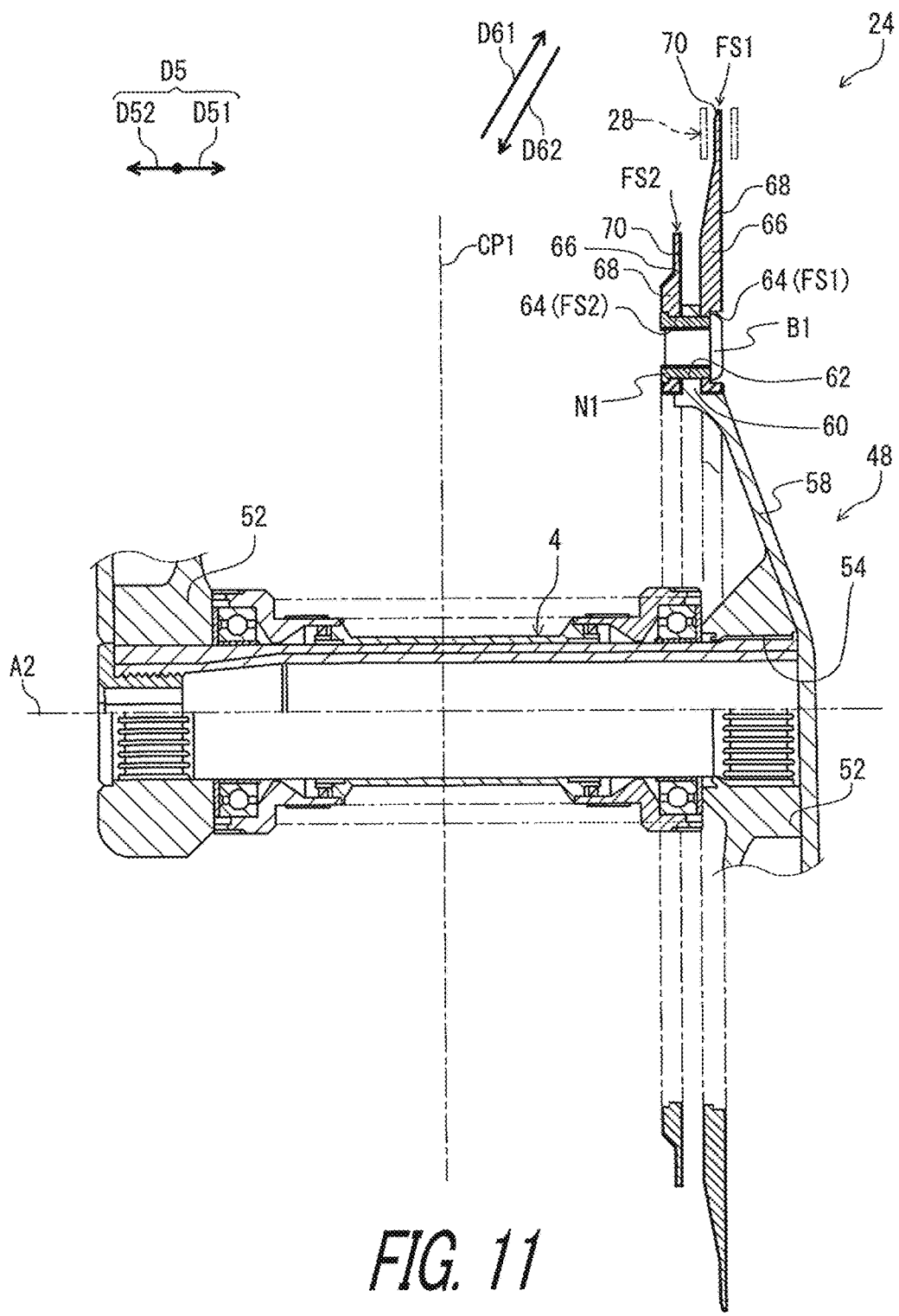
FIG. 11 is a partial cross sectional view of the front sprocket assembly taken along line XI-XI' illustrated in FIG. 10.

As shown in FIGS. 10 and 11, the crank portion 48 includes a crank arm 50 and a sprocket attachment portion 52. The crank arm 50 and the sprocket attachment portion 52 are integrally shaped in this embodiment. Alternatively, the crank arm 50 may be a separate member from the sprocket attachment portion 52. The crank arm 50 radially extends from the rotational center axis A2. The crank arm 50 includes a crank shaft attachment portion 54 and a pedal attachment portion 56. The crank shaft attachment portion 54 is at a base end of the crank arm 50, which is near to the rotational center axis A2. A crank shaft 4 is attached to the crank shaft attachment portion 54. The bicycle pedal 29 (see FIG. 1) is attached to the pedal attachment portion 56.

The sprocket attachment portion 52 includes a plurality of attachment arms 58 and a plurality of sprocket mounting portions 60. In this embodiment, the crank assembly 24 includes four attachment arms 58 and four sprocket mounting portions 60. The plurality of attachment arms 58 radially extend from the crank shaft attachment portion 54 in different directions. Each of the plurality of sprocket mounting portions 60 has a first mounting hole 62 through which a bolt (e.g. B1) passes to be screwed into a nut (e.g. N1). Each of the first front sprocket FS1 and the second front sprocket FS2 includes a plurality of second mounting holes 64 through which the bolt (e.g. B1) passes to be screwed into the nut (e.g. N1). In FIG. 11, a reference sign 64(FS1) specifies a second mounting hole of the first front sprocket FS1, and a reference sign 64(FS2) specifies a second mounting hole of the second front sprocket FS2. The first front sprocket FS1 and the second front sprocket FS2 are attached to each of the plurality of the sprocket mounting portions 60 by the bolt and the nut. However, this attachment method is merely one example and the method for attaching the first front sprocket FS1 and the second front sprocket FS2 to each of the plurality of the sprocket mounting portions 60 is not limited thereto.

As shown in FIG. 11, the front sprockets FS1 and FS2 are arranged in an axial direction D5 parallel to the rotational center axis A2. The front sprockets FS1 and FS2 are spaced apart from each other in the axial direction D5.

The first front sprocket FS1 has an outer diameter which is largest in the bicycle front sprockets FS1 and FS2. The second front sprocket FS2 has an outer diameter which is smallest in the front sprockets FS1 and FS2. The second front sprocket FS2 is closer to the bicycle center plane CP1 of the bicycle frame 12 than the first front sprocket FS1 in a state where the crank assembly 24 is mounted to the bicycle 10. Upshifting occurs when the bicycle chain 28 is shifted by the front derailleur assembly 30 from a small sprocket to a neighboring larger sprocket in an upshifting direction D61. Downshifting occurs when the bicycle chain 28 is shifted by the front derailleur assembly 30 from a large sprocket to a neighboring smaller sprocket in a downshifting direction D62.

The axial direction D5 includes an outward axial direction D51 and an inward axial direction D52. The inward axial direction D52 is opposite to the outward axial direction D51. The upshifting direction D61 is defined along the outward axial direction D51. The downshifting direction D62 is defined along the inward axial direction D52.

Figure 12:
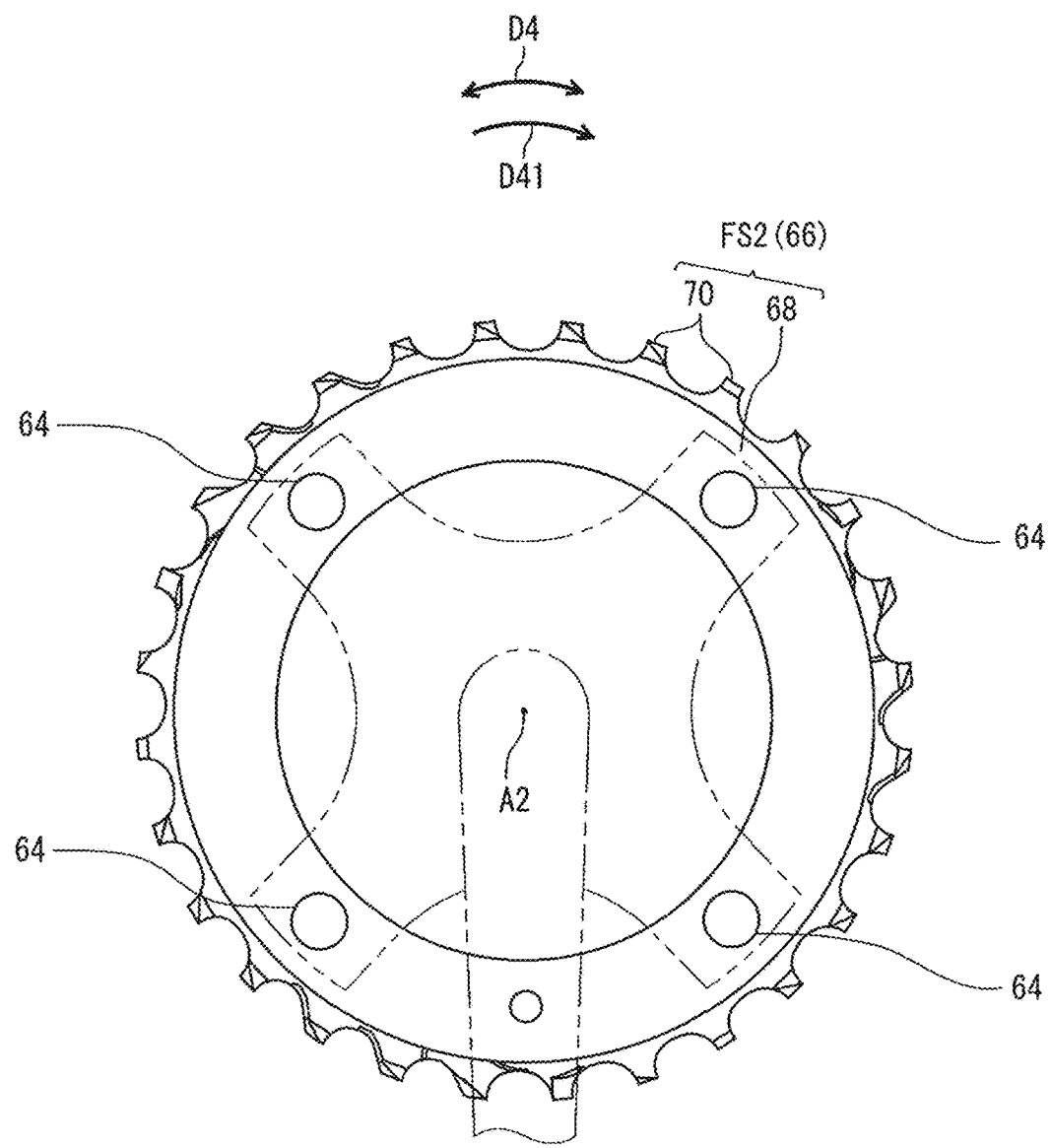
FIG. 12 is a front elevational view of a front sprocket.

FIG. 12 illustrates the second front sprocket FS2 as an example of the front sprockets FS1 and FS2. The front sprocket FS2 is another example of the bicycle component. As shown in FIG. 12, the second front sprocket FS2 has the rotational center axis A2. The second front sprocket FS2 is configured to be rotatable about the rotational center axis A2. The second front sprocket FS2 comprises a front sprocket body 68 and a plurality of front sprocket teeth 70. The front sprocket body 68 is configured to be rotatable about the rotational center axis A2. The front sprocket body 68 has an annular shape. The front sprocket body 68 includes the plurality of second mounting holes 64. The plurality of front sprocket teeth 70 extend radially outward from an outer periphery of the front sprocket body 68. The plurality of front sprocket teeth 70 are configured to engage with the bicycle chain 28 while the bicycle chain 28 is engaged with the second front sprocket FS2. The first front sprocket FS1 has a similar shape except for diameters of the annular shape.

In this embodiment, the front sprocket (one of FS1 and FS2) comprises a slide component 66. Preferably, at least a part including the plurality of front sprocket teeth 70 is the slide component 66. In other words, the bicycle component (one of FS1 and FS2) comprises the slide component 66. The bicycle sprocket (one of FS1 and FS2) comprises the slide component 66. The slide component 66 has substantially the same structure as the slide component 34 shown in FIG. 6. As shown in FIG. 6, the slide component 66 comprises a base member 40 made of the titanium alloy including the surface 41 having the plurality of recesses 41r and the plated layer 42 provided on the base member 40. The base member 40 comprises the internal portion 44 and the border portion 46 provided on the internal portion 44. Ingredients of the internal portion 44 and the border portion 46 in the slide component 66 are the same as those in the slide component 34. The slide component 66 enhances durability of the front sprockets FS1 and FS2.

Figure 13:
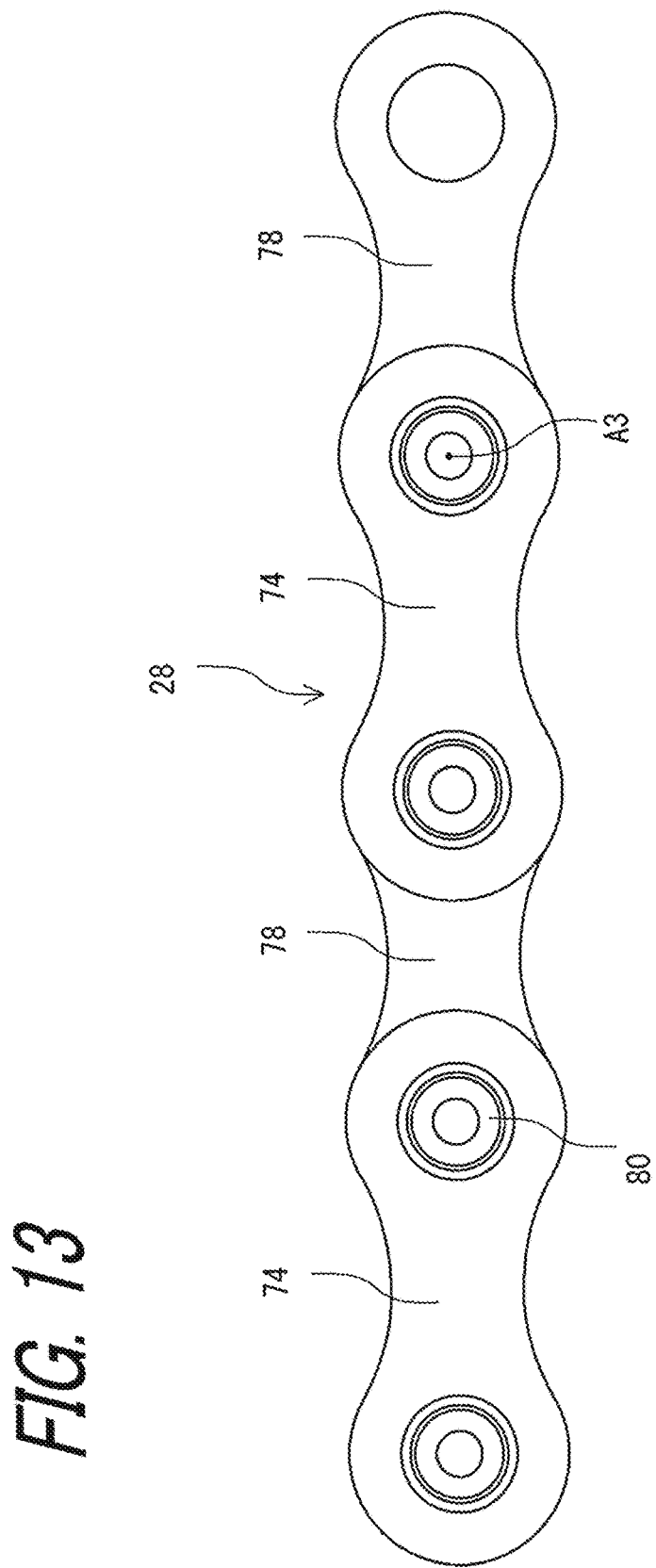
FIG. 13 is a front elevational view of a bicycle chain.
Figure 14:
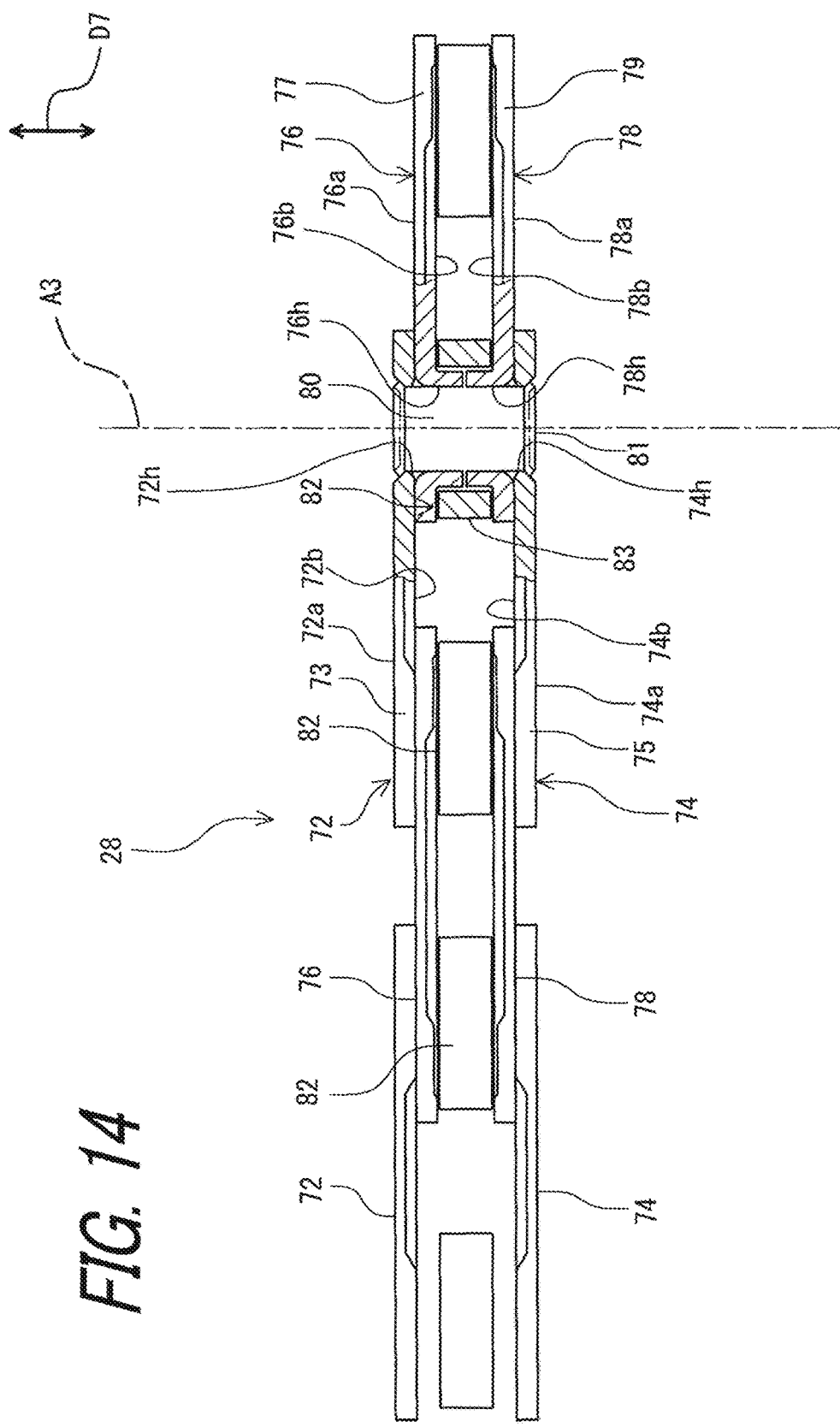
FIG. 14 is a plan view of the bicycle chain.

As shown in FIGS. 13 and 14, the bicycle chain 28 as another example of the bicycle component in accordance with the first embodiment includes a plurality of first outer-link plates 72, a plurality of second outer-link plates 74, a plurality of first inner-link plates 76, a plurality of second inner-link plates 78, a plurality of pin members 80, and a plurality of roller members 82. Each of the plurality of second outer-link plates 74 is opposite to a corresponding one of the plurality of first outer-link plates 72. Each of the plurality of second inner-link plates 78 is opposite to a corresponding one of the plurality of first inner-link plates 76. Pairs of the first inner-link plate 76 and the second inner-link plate 78 are disposed in alternating fashion between pairs of the first outer-link plate 72 and the second outer-link plate 74. Each of the plurality of the pin members 80 connects one of the plurality of first outer-link plates 72, one of the plurality of second outer-link plates 74, one of the plurality of first inner-link plates 76, and one of the plurality of second inner-link plates 78. Each of the plurality of the pin member has a cylindrical shape. Each of the plurality of roller members 82 is disposed between one of the plurality of first inner-link plates 76 and the corresponding one of the plurality of second inner-link plates 78 that is opposite to the one of the plurality of first inner-link plates 76. Each of the plurality of roller members 82 is supported by one of the plurality of first inner-link plates 76 and the corresponding one of the plurality of second inner-link plates 78 that is opposite to the one of the plurality of first inner-link plates 76, and is rotatable about a central axis A3 of the one of the plurality of the pin members 80.

Each of the plurality of first outer-link plates 72, the plurality of second outer-link plates 74, the plurality of first inner-link plates 76, and the plurality of second inner-link plates 78 is a plate member having a gourd shape. Each of the plurality of first outer-link plates 72 includes a first outer surface 72a and a first inner surface 72b opposite to the first outer surface 72a in an axial direction D7 parallel to the central axis A3. Each of the plurality of second outer-link plates 74, which is opposite to the each of the plurality of first outer-link plates 72, includes a second outer surface 74a and a second inner surface 74b opposite to the second outer surface 74a in the axial direction D7. The first inner surface 72b faces the second inner surface 74b in the axial direction D7. Each of the plurality of first inner-link plates 76 includes a third outer surface 76a and a third inner surface 76b opposite to the third outer surface 76a in the axial direction D7. Each of the plurality of second inner-link plates 78, which is opposite to the each of the plurality of first inner-link plates 76, includes a fourth outer surface 78a and a fourth inner surface 78b opposite to the fourth outer surface 78a in the axial direction D7. The third inner surface 76b faces the fourth inner surface 78b in the axial direction D7.

Each of the plurality of first outer-link plates 72 includes two first linking holes 72h at both ends of the each of the plurality of first outer-link plates 72 in a first direction perpendicular to the axial direction D7. Each of the plurality of second outer-link plates 74, which is opposite to the each of the plurality of first outer-link plates 72, includes two second linking holes 74h at both ends of the each of the plurality of second outer-link plates 74 in the first direction. Each of the plurality of first inner-link plates 76, which is connected to the each of the plurality of first outer-link plates 72, includes a third linking hole 76h at both ends of the each of the plurality of first inner-link plates 76 in a second direction perpendicular to the axial direction D7. Each of the plurality of second inner-link plates 78, which is opposite to the each of the plurality of first inner-link plates 76, includes fourth linking holes 78h at both ends of the each of the plurality of second inner-link plates 78 in the second direction. The pin member 80 passes through the first linking hole 72h, the second linking hole 74h, the third linking hole 76h, and the fourth linking hole 78h.

The plurality of rear sprocket teeth 38 and the plurality of front sprocket teeth 70 can contact the first inner surface 72b, the second inner surface 74b, the third inner surface 76b, and the fourth inner surface 78b, and each of the plurality of roller members 82. A cylindrical surface of the each of the pin members 80 rubs against edges of the first linking hole 72h, the second linking hole 74h, the third linking hole 76h, and the fourth linking hole 78h.

In this embodiment, each of the plurality of first outer-link plates 72 comprises a slide component 73. Preferably, at least a part including the first inner surface 72b of the each of the plurality of first outer-link plates 72 is the slide component 73. Each of the plurality of second outer-link plates 74 comprises a slide component 75. Preferably, at least a part including the second inner surface 74b of the each of the plurality of second outer-link plates 74 is the slide component 75. Each of the plurality of first inner-link plates 76 comprises a slide component 77. Preferably, at least a part including the third inner surface 76b of the each of the plurality of first inner-link plates 76 is the slide component 77. Each of the plurality of second inner-link plates 78 comprises a slide component 79. Preferably, at least a part including the fourth inner surface 78b of the each of the plurality of second inner-link plates 78 is the slide component 79. Each of the plurality of pin members 80 comprises a slide component 81. Preferably, at least a part including the cylindrical surface of the each of the plurality of roller members 82 is the slide component 83. The roller member 82 comprises a slide component 83.

In other words, the bicycle chain 28 comprises slide components 73, 75, 77, 79, 81, and 83. The bicycle component 28 comprises at least one of slide components 73, 75, 77, 79, 81, and 83. The slide components 73, 75, 77, 79, 81, and 83 have substantially the same structure as the slide component 34 shown in FIG. 6. As shown in FIG. 6, each of the slide components 73, 75, 77, 79, 81, and 83 comprises a base member 40 made of the titanium alloy including the surface 41 having the plurality of recesses 41r and the plated layer 42 provided on the base member 40. The base member 40 comprises the internal portion 44 and the border portion 46 provided on the internal portion 44. Ingredients of the internal portion 44 and the border portion 46 in the slide components 73, 75, 77, 79, 81, and 83 are the same as those in the slide component 34.

The slide components 73, 75, 77, 79, 81, and 83 enhance durability of the bicycle chain 28. Specifically, the slide components 81 and 83 enhance durability of the pin member 80 and the roller member 82, respectively. In addition, the slide components 73, 75, 77, 79, 81, and 83 decrease sliding friction between the bicycle chain 28 and the rear sprocket assembly 26 as well as sliding friction between the bicycle chain 28 and the crank assembly 24 to improve rotation transmission efficiency.

Figure 15:
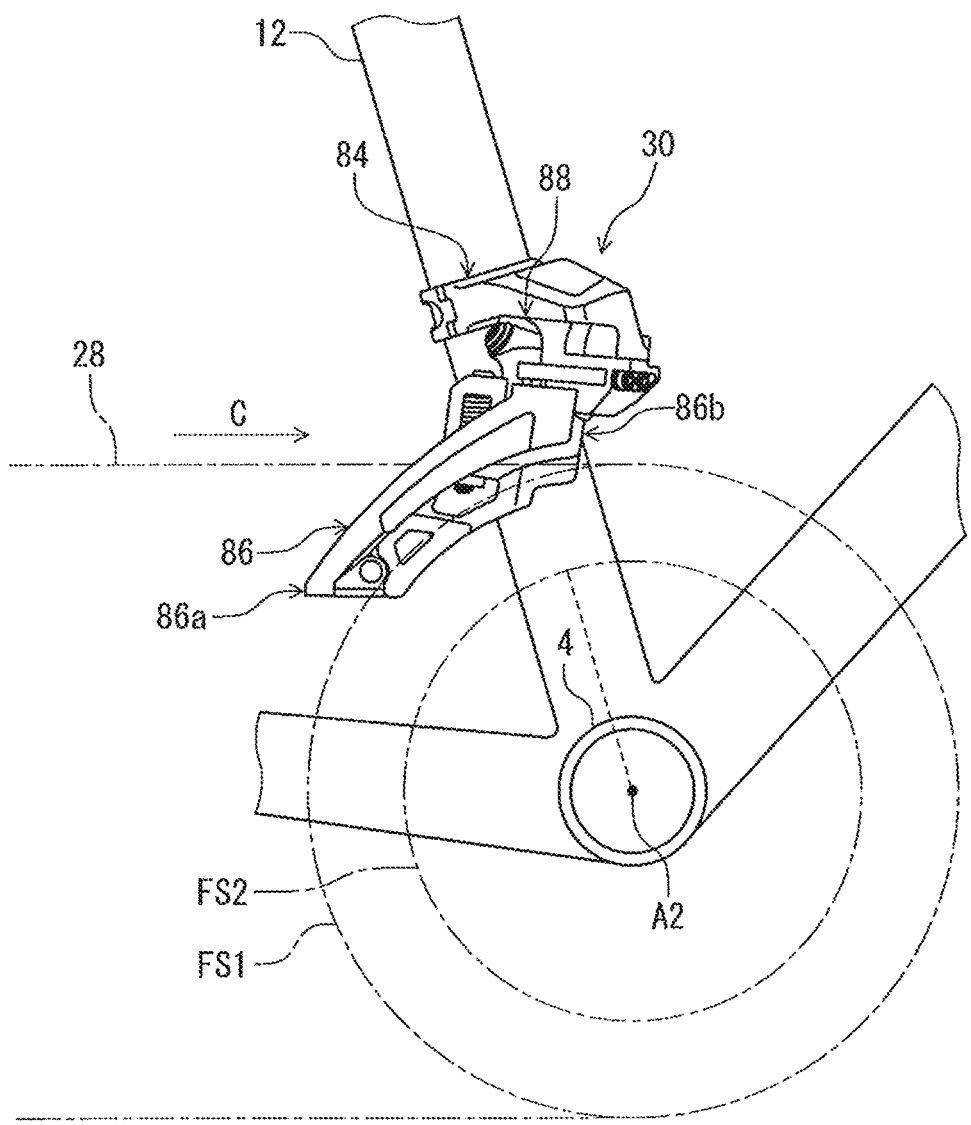
FIG. 15 is a side elevational view of the bicycle that is equipped with a front derailleur in accordance with the first embodiment.

As shown in FIG. 15, the front derailleur assembly 30 in accordance with the first embodiment is detachably mounted on the bicycle frame 12. A shift operation is conducted to the front derailleur assembly 30 by an operation device which is mounted on the handlebar 18 of the bicycle 10 through an operation cable which is not illustrated in the drawings.

Figure 16:
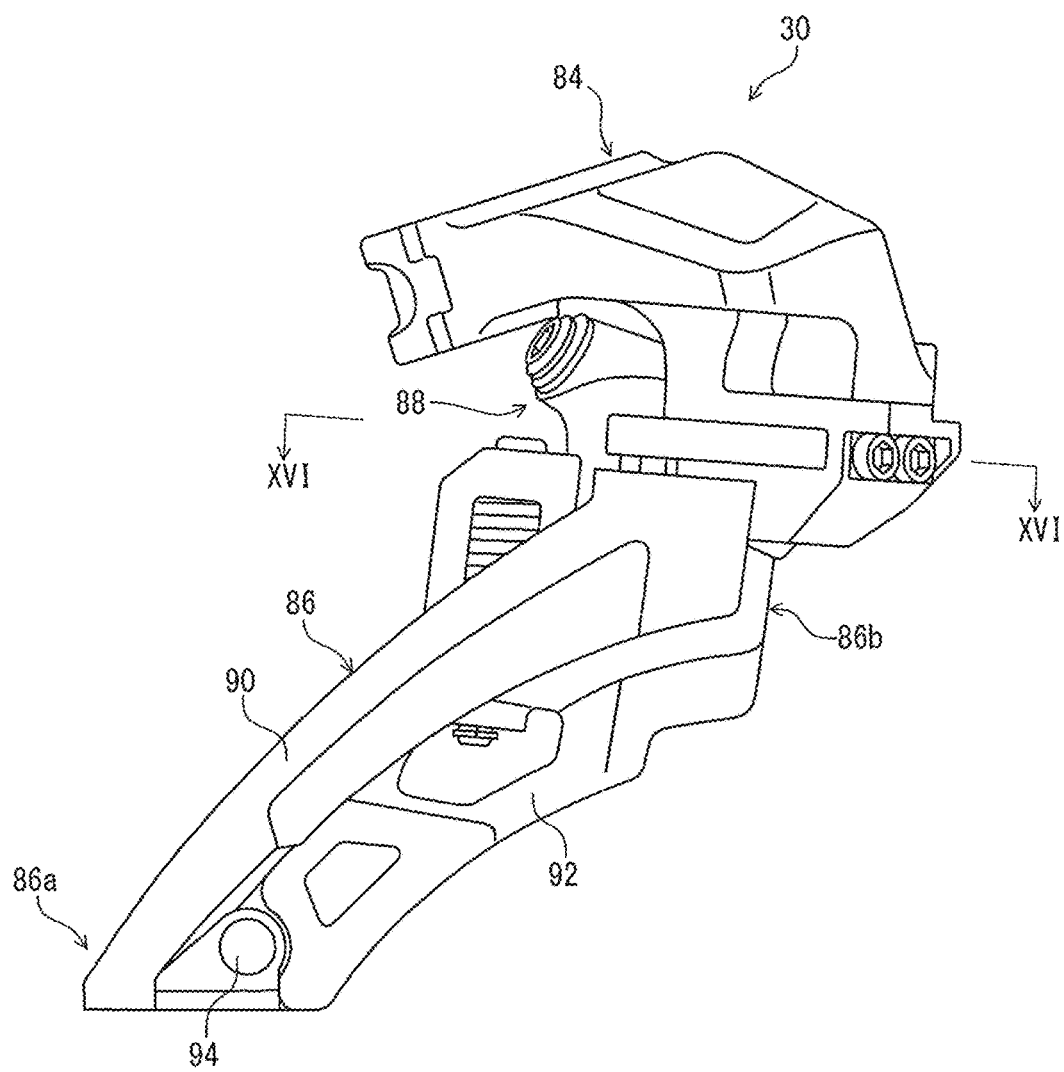
FIG. 16 is an enlarged right side elevational view of the front derailleur in accordance with the first embodiment.

As shown in FIG. 16, the front derailleur assembly 30 includes a front derailleur attachment portion 84, a first chain guide 86, and a first link mechanism 88. The front derailleur attachment portion 84 is configured to be attached firmly to the bicycle 10 in a detachable and re-installable manner. The first chain guide 86 is configured to guide the bicycle chain 28. The first link mechanism 88 movably couples the first chain guide 86 to the front derailleur attachment portion 84. In particular, the first link mechanism 88 movably couples the first chain guide 86 to the front derailleur attachment portion 84 among a retracted position close to the bicycle frame 12 and an extended position away from the bicycle frame 12 compared to the retracted position in response to movement of the operation cable, for example. In this way, the first chain guide 86 guides the bicycle chain 28 to any one of the front sprockets FS1 and FS2 in response to the operation of the operation device.

Figure 17:
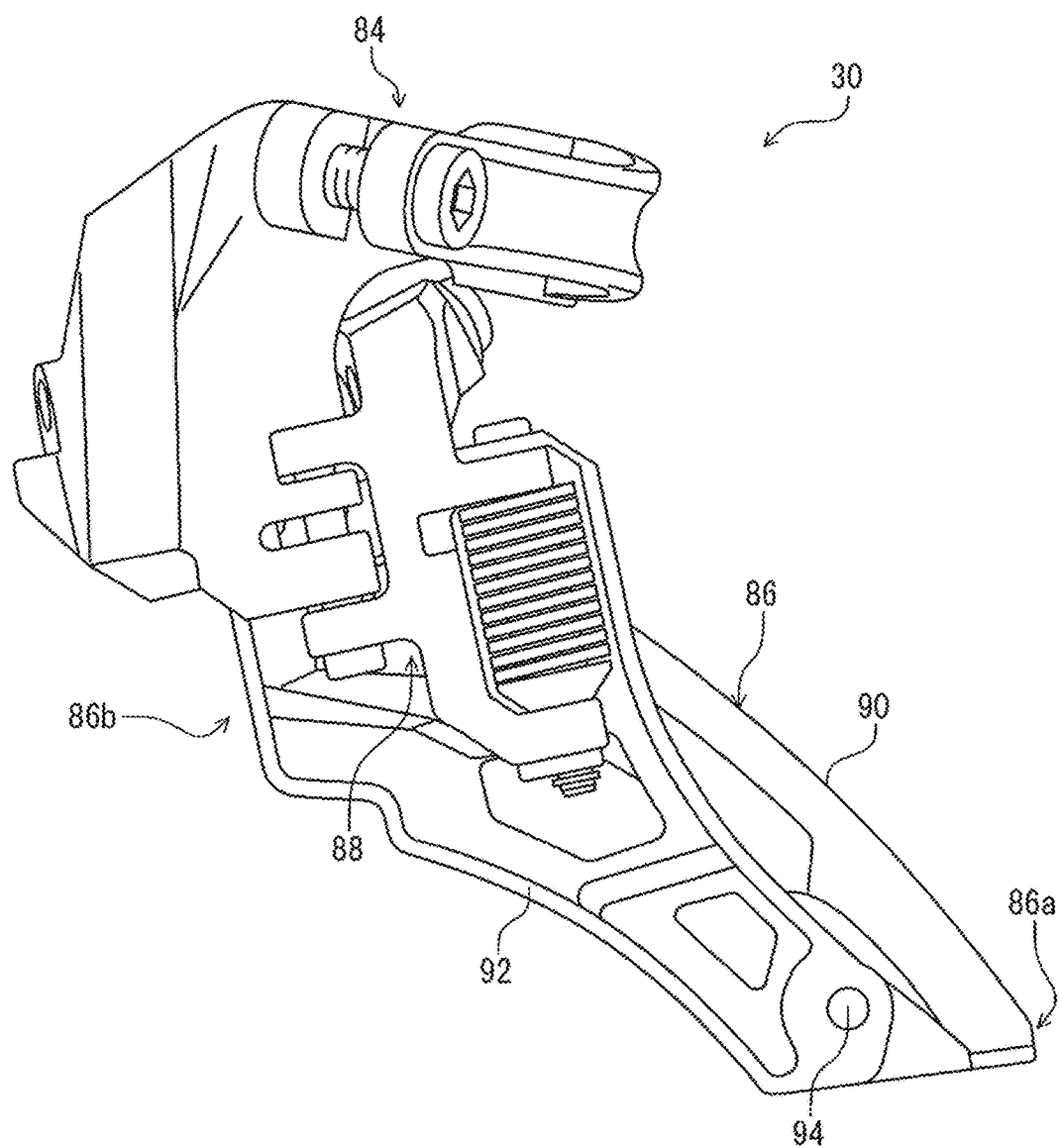
FIG. 17 is an enlarged left side view of the front derailleur in accordance with the first embodiment.
Figure 18:
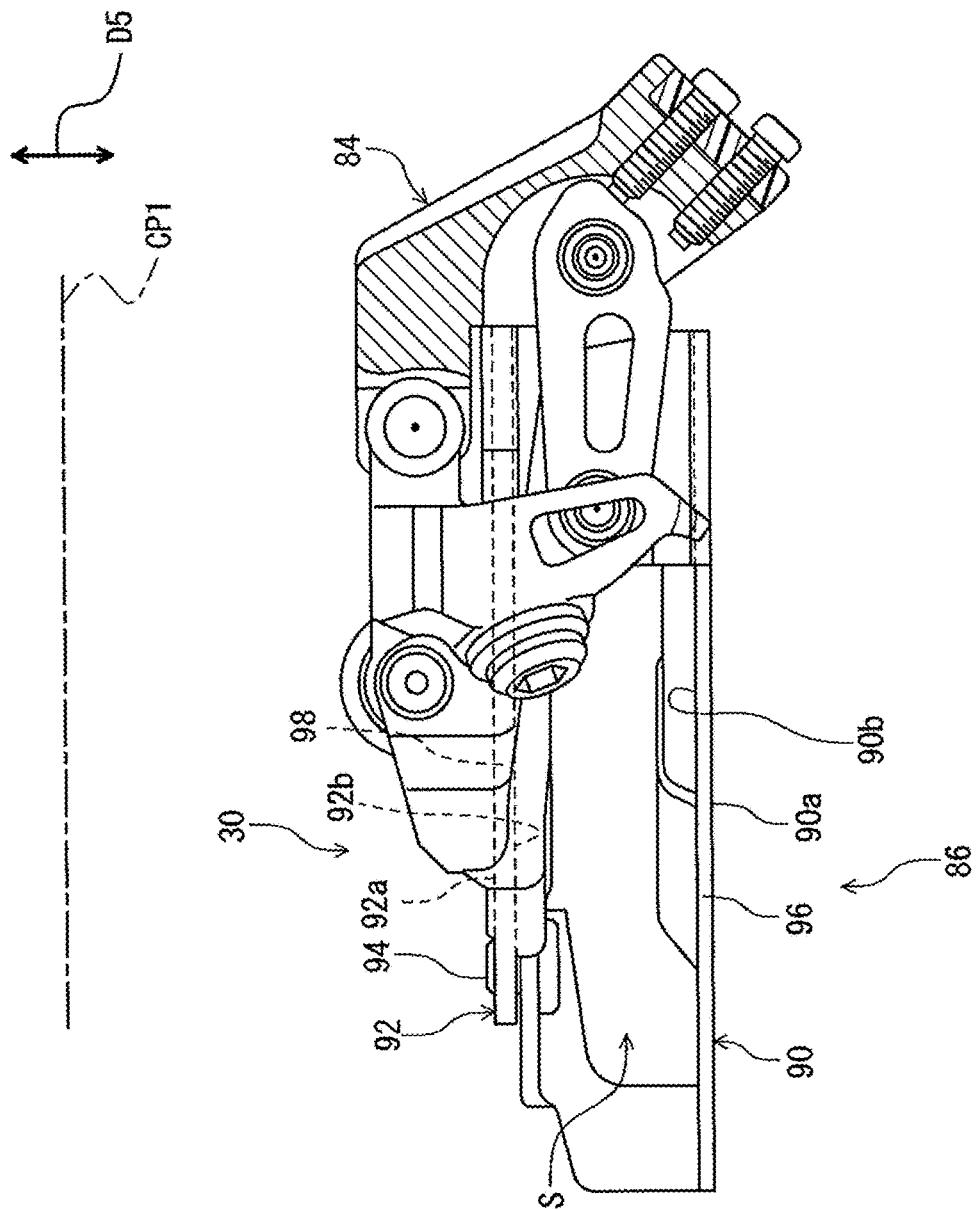
FIG. 18 is a cross-sectional view of the front derailleur as seen along section line XVI-XVI' of FIG. 16.

As shown in FIGS. 16 to 18, the first chain guide 86 includes a first guide plate 90 (outer guide plate) and a second guide plate 92 (inner guide plate). The first guide plate 90 and the second guide plate 92 are other examples of the bicycle components. A chain slot S is provided between the first guide plate 90 and the second guide plate 92 through which the bicycle chain 28 passes. The first guide plate 90 and the second guide plate 92 are arranged to face each other in the axial direction D5 of the rotational center axis A2 of the crank assembly 24. The second guide plate 92 is closer to the bicycle center plane CP1 of the bicycle frame 12 than the first guide plate 90 in a state where the front derailleur assembly 30 is mounted on the bicycle frame 12. As described above, the first chain guide 86 is movably coupled to the front derailleur attachment portion 84 by the first link mechanism 88 between the retracted position and the extended position. The first chain guide 86 has an upstream end 86a and a downstream end 86b. The terms "upstream" and "downstream" as used herein mean with respect to the movement direction of the bicycle chain 28 during pedaling. For example, in FIG. 15, the bicycle chain 28 moves in the arrow C direction during pedaling. Accordingly, the left side in FIG. 15 is upstream and the right side in FIG. 15 is downstream. The first guide plate 90 is bent at the upstream end 86a to extend toward the second guide plate 92. In addition, the first guide plate 90 is coupled to the second guide plate 92 by a rivet 94. The first guide plate 90 and the second guide plate 92 are coupled to each other at the downstream end 86b.

As shown in FIG. 18, the first guide plate 90 includes a fifth outer surface 90a and a fifth inner surface 90b opposite to the fifth outer surface 90a in the axial direction D5. The second guide plate 92 includes a sixth outer surface 92a and a sixth inner surface 92b opposite to the sixth outer surface 92a in the axial direction D5. The fifth inner surface 90b faces the sixth inner surface 92b. The fifth inner surface 90b of the first guide plate 90 contacts the second outer surface 74a and the fourth outer surface 78a of the bicycle chain 28 and moves in a leftward lateral direction toward the bicycle frame 12 such that the bicycle chain 28 is moved toward the retracted position. The sixth inner surface 92b of the second guide plate 92 contacts the first outer surface 72a and the third outer surface 76a of the bicycle chain 28 and moves in a rightward lateral direction away from the bicycle frame 12 such that the bicycle chain 28 is moved toward the extended position.

In this embodiment, the first guide plate 90 comprises a slide component 96. Preferably, at least a part including the fifth inner surface 90b of the first guide plate 90 is the slide component 96. The second guide plate 92 comprises a slide component 98. Preferably, at least a part including the sixth inner surface 92b of the second guide plate 92 is the slide component 98. In other words, the bicycle component 30 comprises at least one of the slide components 96 and 98. The bicycle component 90 comprises the slide component 96. The bicycle component 92 comprises the slide component 98.

The slide components 96 and 98 have the substantially the same structure as the slide component 34 shown in FIG. 6. As shown in FIG. 6, each of the slide components 96 and 98 comprises a base member 40 made of the titanium alloy including the surface 41 having the plurality of recesses 41r and the plated layer 42 provided on the base member 40. The base member 40 comprises the internal portion 44 and the border portion 46 provided on the internal portion 44. Ingredients of the internal portion 44 and the border portion 46 in the slide components 96 and 98 are the same as those in the slide component 34.

Considering the bicycle chain 28 contacts the first guide plate 90 and the second guide plate 92 during gear shifting, at least a part including the first outer surface 72a of the each of the plurality of first outer-link plates 72 of the bicycle chain 28 is the slide component 73. At least a part including the second outer surface 74a of the each of the plurality of second outer-link plates 74 of the bicycle chain 28 is the slide component 75. At least a part including the third outer surface 76a of the each of the plurality of first inner-link plates 76 of the bicycle chain 28 is the slide component 77. At least a part including the fourth outer surface 78a of the each of the plurality of second inner-link plates 78 of the bicycle chain 28 is the slide component 79.

The slide components 96 and 98 enhance durability of the first guide plate 90 and the second guide plate 92. In addition, the slide components 96 and 98 decrease sliding friction between the bicycle chain 28 and the first guide plate 90 as well as sliding friction between the bicycle chain 28 and the second guide plate 92 to improve rotation transmission efficiency.

Figure 19:
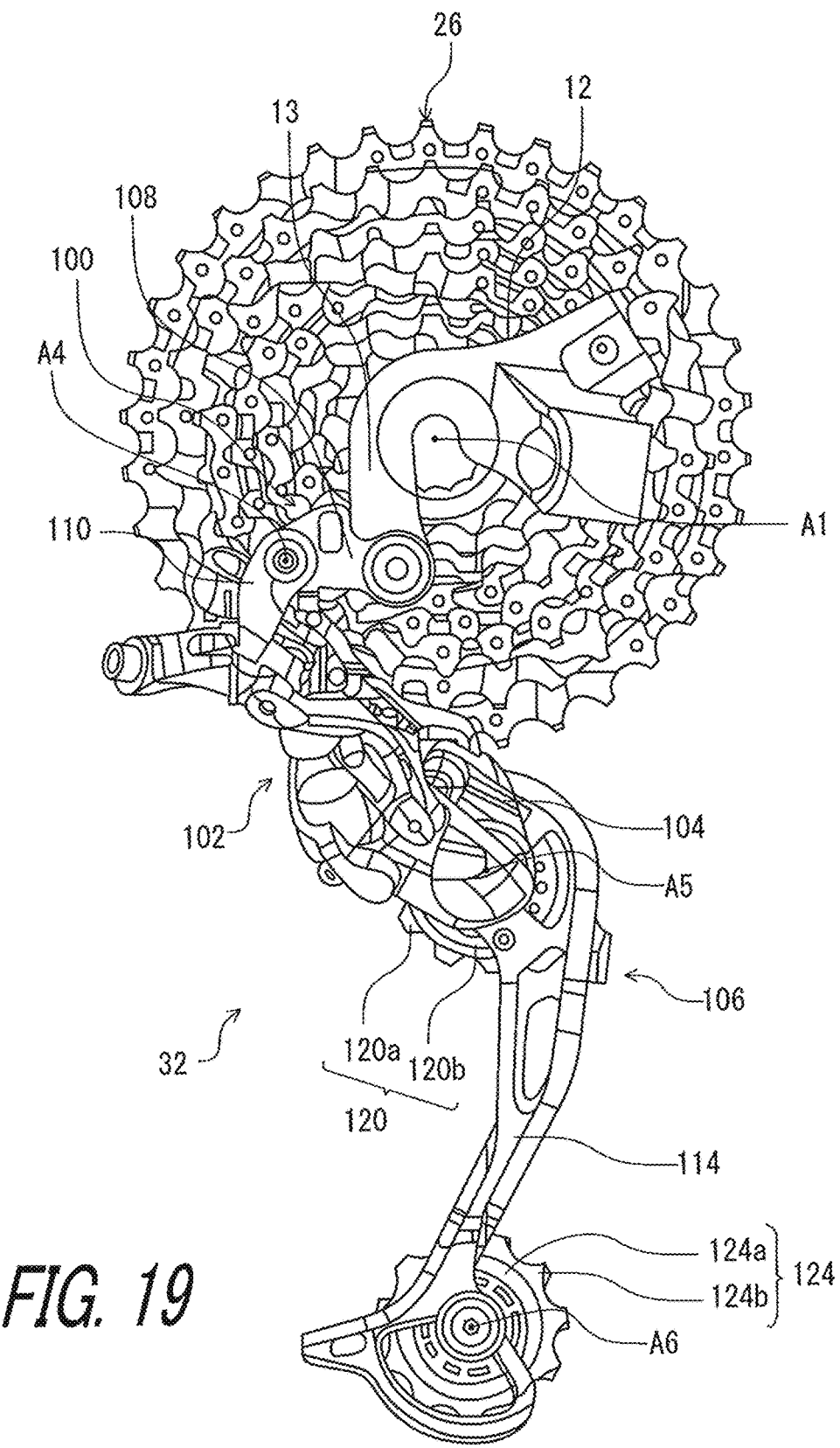
FIG. 19 is a front elevational view of a rear derailleur assembly in accordance with the first embodiment.
Figure 20:
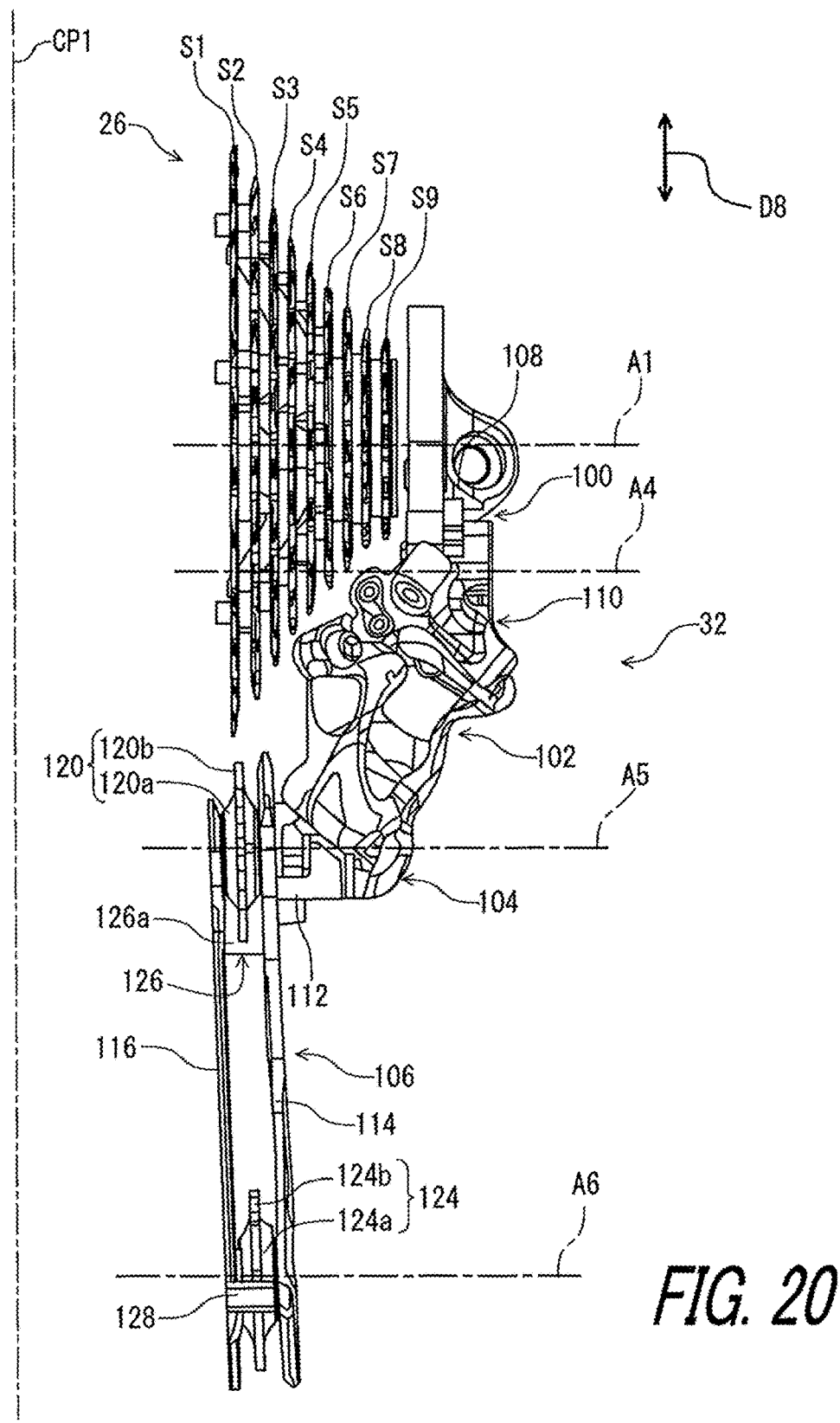
FIG. 20 is a side elevational view of the rear derailleur assembly viewed from the rear of the bicycle.

As shown in FIGS. 19 and 20, the rear derailleur assembly 32 in accordance with the first embodiment comprises a rear derailleur attachment portion 100, a second link mechanism 102, a movable member 104 and a second chain guide 106.

The rear derailleur attachment portion 100 is fastened to the rear hanger part 13 of the bicycle frame 12 such that the rear derailleur assembly 32 is detachably mounted on the rear hanger part 13 of the bicycle frame 12. The rear derailleur attachment portion 100 includes a derailleur bracket 108 and a base rotatable member 110. The derailleur bracket 108 can be fastened to the rear hanger part 13 of the bicycle frame 12. The base rotatable member 110 is mounted on the derailleur bracket 108 so that the base rotatable member 110 can rotate about a first center pivot axis A4 that is substantially parallel to the rotational center axis A1 of the rear sprocket assembly 26.

The second link mechanism 102 has a first end pivotally mounted on the rear derailleur attachment portion 100 and can move with respect to the rear derailleur attachment portion 100. The second link mechanism 102 is a four-point link mechanism for connecting the movable member 104 to the base rotatable member 110 so that the movable member 104 can move relatively with respect to the base rotatable member 110.

The movable member 104 is pivotally connected to a second end of the second link mechanism 102, which is opposite to the first end of the second link mechanism 102. The movable member 104 connects the second chain guide 106 so that the second chain guide 106 is swingable about a second center pivot axis A5, which is substantially parallel to the rotational center axis A1. The movable member 104 has a chain guide attachment portion 112. The second chain guide 106 is swingably mounted on the chain guide attachment portion 112.

The second chain guide 106 is pivotally connected to the movable member 104.

Figure 21:
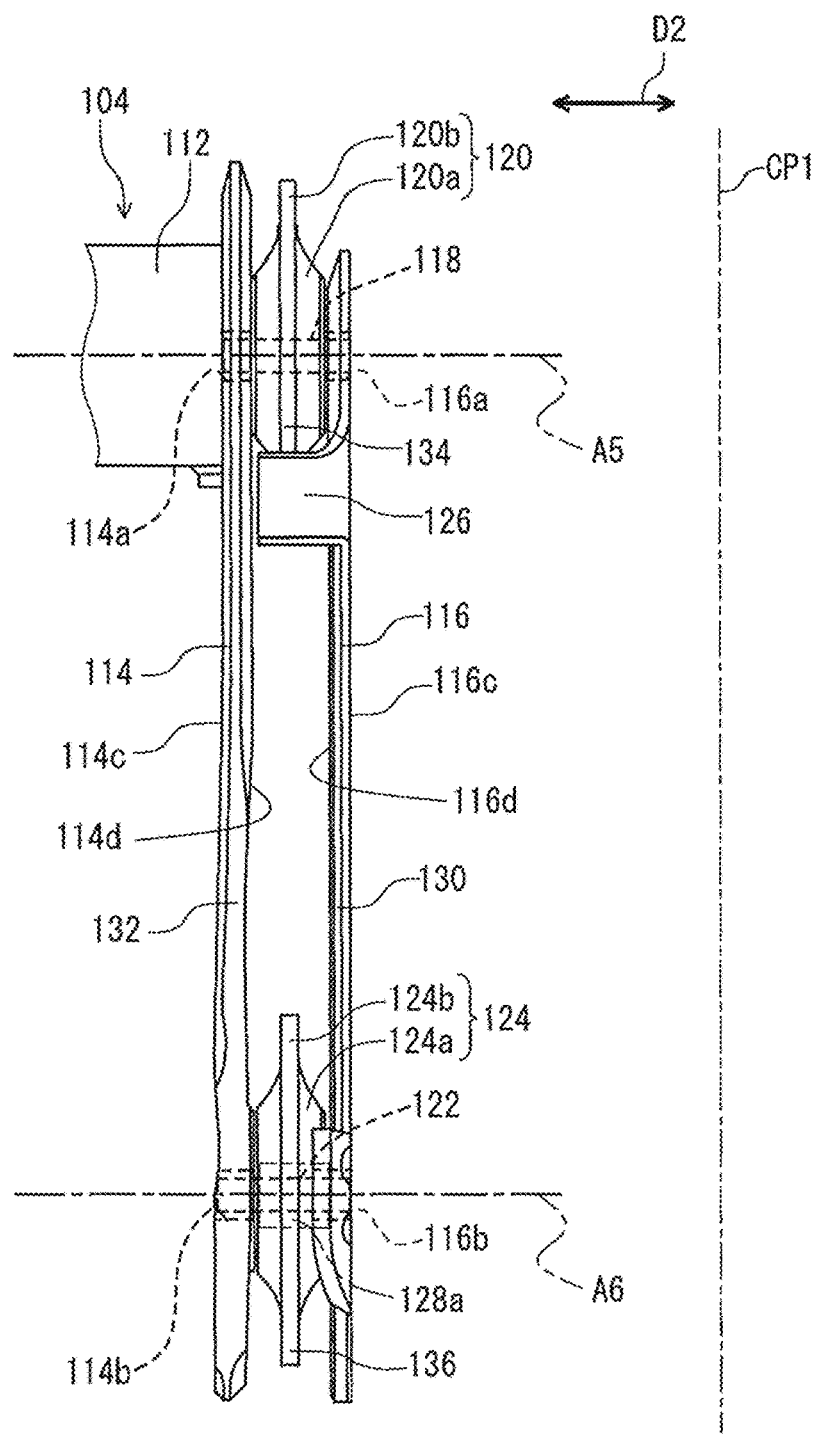
FIG. 21 is an enlarged side elevational view of a second chain guide of the rear derailleur assembly viewed from the front of the bicycle.

The second chain guide 106 moves the bicycle chain 28 in order to selectively transfer the bicycle chain 28 to one of the rear sprockets S1 to S9 of the rear sprocket assembly 26. As shown in FIGS. 19 to 21, the second chain guide 106 has a third guide plate 114, a fourth guide plate 116, a first supporting shaft 118, a guide pulley 120, a second supporting shaft 122, and a tension pulley 124. The third guide plate 114, the fourth guide plate 116, the guide pulley 120, and the tension pulley 124 are other examples of the bicycle components. The third guide plate 114 is swingably mounted on the chain guide attachment portion 112. The fourth guide plate 116 is disposed facing the third guide plate 114. The fourth guide plate 116 is closer to the bicycle center plane CP1 of the bicycle frame 12 than the third guide plate 114 in a state where the rear derailleur assembly 32 is mounted to the bicycle frame 12.

The third guide plate 114 has a first through hole 114a and a second through hole 114b on both ends in a longitudinal direction of the third guide plate 114, which is perpendicular to the second center pivot axis A5. The fourth guide plate 116 has a third through hole 116a and a fourth through hole 116b on both ends in a longitudinal direction of the fourth guide plate 116, which is perpendicular to the second center pivot axis A5. The first through hole 114a and the third through hole 116a are holes into which the first supporting shaft 118 is inserted. The second through hole 114b and the fourth through hole 116b are holes into which the second supporting shaft 122 is inserted.

The guide pulley 120 is rotatably supported by the first supporting shaft 118 between the third guide plate 114 and the fourth guide plate 116. The guide pulley 120 can rotate about the second center pivot axis A5. The guide pulley 120 includes a guide pulley boss 120a and a plurality of guide pulley teeth 120b. The guide pulley boss 120a has an annular shape. The guide pulley boss 120a has a hole into which the first supporting shaft 118 is inserted, which is not illustrated in the drawings. The plurality of guide pulley teeth 120b extends radially outward from an outer periphery of the guide pulley boss 120a. The plurality of guide pulley teeth 120b engages the bicycle chain 28.

The tension pulley 124 is rotatably supported by the second supporting shaft 122 between the third guide plate 114 and the fourth guide plate 116. The tension pulley 124 can rotate about a third center pivot axis A6, which is substantially parallel to the rotational center axis A1. The tension pulley 124 includes a tension pulley boss 124a and a plurality of tension pulley teeth 124b. The tension pulley boss 124a has an annular shape. The tension pulley boss 124a has a hole into which the second supporting shaft 122 is inserted, which is not illustrated in the drawings. The plurality of tension pulley teeth 124b extends radially outward from an outer periphery of the tension pulley boss 124a. The plurality of tension pulley teeth 124b engages the bicycle chain 28.

The fourth guide plate 116 further includes a first chain slip prevention part 126 and a second chain slip prevention part 128. The first chain slip prevention part 126 and the second chain slip prevention part 128 are disposed between the third guide plate 114 and the fourth guide plate 116. The first chain slip prevention part 126 is disposed in the vicinity of the guide pulley 120. The second chain slip prevention part 128 is disposed in the vicinity of the tension pulley 124. In this embodiment, the first chain slip prevention part 126 and the second chain slip prevention part 128 are shaped by bending the fourth guide plate 116 toward the third guide plate 114. The first chain slip prevention part 126 prevents the bicycle chain 28 from slipping off of the guide pulley 120. The second chain slip prevention part 128 prevents the bicycle chain 28 from slipping off of the tension pulley 124.

The third guide plate 114 further has a seventh outer surface 114c and a seventh inner surface 114d opposite to the seventh outer surface 114c in the axial direction D2 parallel to the second center pivot axis A5. The fourth guide plate 116 further has an eighth outer surface 116c and an eighth inner surface 116d opposite to the eighth outer surface 116c in the axial direction D2. The seventh inner surface 114d faces the eighth inner surface 116d. The first chain slip prevention part 126 has a ninth inner surface 126a facing the guide pulley 120. The second chain slip prevention part 128 has a tenth inner surface 128a facing the tension pulley 124.

In the rear derailleur assembly 32 constructed in this manner, when an inner wire of a gearshift cable which is not illustrated in the drawings is pulled due to a shift operation, the second link mechanism 102 moves the second chain guide 106 closer to the bicycle center plane CP1, i.e., to a side of the rear sprocket S1. When this pulling is relaxed, the second link mechanism 102 moves the second chain guide 106 away from the bicycle center plane CP1, i.e., to a side of the rear sprocket S9. As a result of the motion of the second link mechanism 102, the second chain guide 106 moves into a position facing one of the rear sprockets S1 through S9 in a direction D8 perpendicular to the rotational center axis A1 of the rear sprocket assembly 26 and guides the bicycle chain 28 to one of the rear sprockets S1 through S9.

The bicycle chain 28 contacts the plurality of guide pulley teeth 120b and the plurality of tension pulley teeth 124b. In addition, the bicycle chain 28 may contact the seventh inner surface 114d, the eighth inner surface 116d, the ninth inner surface 126a, and the tenth inner surface 128a.

In this embodiment, the third guide plate 114 comprises a slide component 130. Preferably, at least a part including the seventh inner surface 114d of the third guide plate 114 is the slide component 130. The fourth guide plate 116 comprises a slide component 132. Preferably, at least a part including the eighth inner surface 116d, the ninth inner surface 126a, and the tenth inner surface 128a of the fourth guide plate 116 is the slide component 132. The guide pulley 120 comprises a slide component 134. Preferably, at least a part including the plurality of guide pulley teeth 120b of the guide pulley 120 is the slide component 134. The tension pulley 124 comprises a slide component 136. Preferably, at least a part including the plurality of tension pulley teeth 124b of the tension pulley 124 is the slide component 136. In other words, the bicycle component 32 comprises at least one of the slide components 130, 132, 134, and 136.

The slide components 130, 132, 134, and 136 have substantially the same structure as the slide component 34 shown in FIG. 6. As shown in FIG. 6, each of the slide components 130, 132, 134, and 136 comprises the base member 40 made of the titanium alloy including the surface 41 having the plurality of recesses 41r and the plated layer 42 provided on the base member 40. The base member 40 comprises the internal portion 44 and the border portion 46 provided on the internal portion 44. Ingredients of the internal portion 44 and the border portion 46 in the slide components 130, 132, 134, and 136 are the same as those in the slide component 34.

The slide components 130, 132, 134, and 136 enhance durability of the third guide plate 114, the fourth guide plate 116, the guide pulley 120, and the tension pulley 124. In addition, the slide components 134 and 136 decrease sliding friction between the bicycle chain 28 and the guide pulley 120 as well as sliding friction between the bicycle chain 28 and the tension pulley 124 to improve rotation transmission efficiency.

In this embodiment, other components than the crank assembly 24, the rear sprocket assembly 26, the bicycle chain 28, the front derailleur assembly 30, and a rear derailleur assembly 32 may have a slide component having substantially the same structure as the slide component 34 shown in FIG. 6. For example, a fork suspension such as the fork suspension 14b, a cylindrical surface of the seatpost assembly 20, and an inner peripheral surface of a seat tube of the bicycle frame 12 may comprise the slide component having substantially the same structure as the slide component 34 shown in FIG. 6. If the bicycle 10 has an internal transmission in the bicycle hub assembly 2 or near the crank shaft 4, gears of the internal transmission may comprise the slide component having substantially the same structure as the slide component 34 shown in FIG. 6.

The slide components 34, 66, 73, 75, 77, 79, 81, 83, 96, 98, 130, 132, 134 and 136 have the following features.

(1) These slide components comprise the base member 40 and the plated layer 42. The base member 40 is made of the titanium alloy including the beta phase of titanium. The base member 40 includes the surface having the plurality of recesses 41r. The plated layer 42 is provided on the surface. The titanium alloy is lightweight and has high strength. Although the titanium alloy has weak abrasion resistance, the base member 40 made of the titanium alloy is protected by the plated layer 42. Plating material has typically low adhesion to the titanium alloy, but the plated layer 42 can firmly adhere to the base member 40 by the plurality of recesses 41r due to anchor effect. Therefore, these slide components can be lightweight and have high strength with abrasion resistance.

(2) The titanium alloy includes the alpha phase of titanium. Therefore, it is possible to effectively form the plurality of recesses 41r on the surface of the base member 40.

(3) The plurality of recesses 41r are formed by partly removing the alpha phase of titanium. Therefore, it is possible to effectively form the plurality of recesses 41r on the surface of the base member 40.

(4) The alpha phase of titanium is partly replaced with zinc. Zinc can delay oxidization of titanium before the plated layer is provided on the base member, thus zinc can further improve the adhesion between the base member and the plated layer.

(5) The plated layer 42 includes nickel. The plated layer including nickel can be corrosion-resistant, and provide abrasion resistance to the slide component.

(6) The plurality of recesses 41r include at least one recess 41re having the first length L1 that ranges between 50 nanometers and 150 nanometers. The plated layer 42 can further firmly adhere to the base member 40 by the plurality of recesses 41r due to anchor effect.

(7) The at least one recess 41re has the second length L2 that ranges between 1 micrometer and 10 micrometers. The plated layer 42 can further firmly adhere to the base member 40 by the plurality of recesses 41r due to anchor effect.

(8) Each of the rear sprockets S1 to S9 (the bicycle components S1 to S9) comprises the slide component 34. Thus, the slide component 34 enhances durability of each of the rear sprockets S1 to S9 (the bicycle components S1 to S9). Each of the bicycle front sprockets FS1 and FS2 (the bicycle components FS1 and FS2) comprises the slide component 66. Thus, the slide component 66 enhances durability of each of the front sprockets FS1 and FS2 (the bicycle components FS1 and FS2). Each of the bicycle sprockets S1 to S9, FS1 and FS2 comprises the slide component 34 or 66. Thus, the slide component 34 or 66 enhances durability of each of the bicycle sprockets S1 to S9, FS1 and FS2. The bicycle chain 28 (the bicycle component 28) comprises the slide components 73, 75, 77, 79, 81, and 83. Thus, the slide component 73, 75, 77, 79, 81, and 83 enhances durability of the bicycle chain 28 (the bicycle component 28). The pin member 80 of the bicycle chain 28 (the bicycle component 80) comprises the slide component 81. Thus, the slide component 81 enhances durability of the pin member 80 (the bicycle component 80). The roller member 82 of the bicycle chain 28 (the bicycle component 82) comprises the slide component 83. Thus, the slide component 83 enhances durability of the roller member 82 (the bicycle component 82). Each of the bicycle components 30, and 32 comprises some of the slide components 96, 98, 130, 132, 134 and 136. Thus, the slide components 96, 98, 130, 132, 134 and 136 enhance durability of the bicycle components 30 and 32.

The method of manufacturing the slide components 34, 66, 73, 75, 77, 79, 81, 83, 96, 98, 130, 132, 134 and 136 has the following additional features.

(9) The method comprises the etching the base member 40 to remove the oxide film on the base member 40 before the removing the at least part of the alpha phase of titanium. Thus, adhesion of the plated layer to the base member is enhanced.

(10) The method further comprises the desmutting the base member 40 after the etching the base member 40. Therefore, smut on the base member is removed to enhance adhesion of the plated layer to the base member.

Second Embodiment

Figure 22:
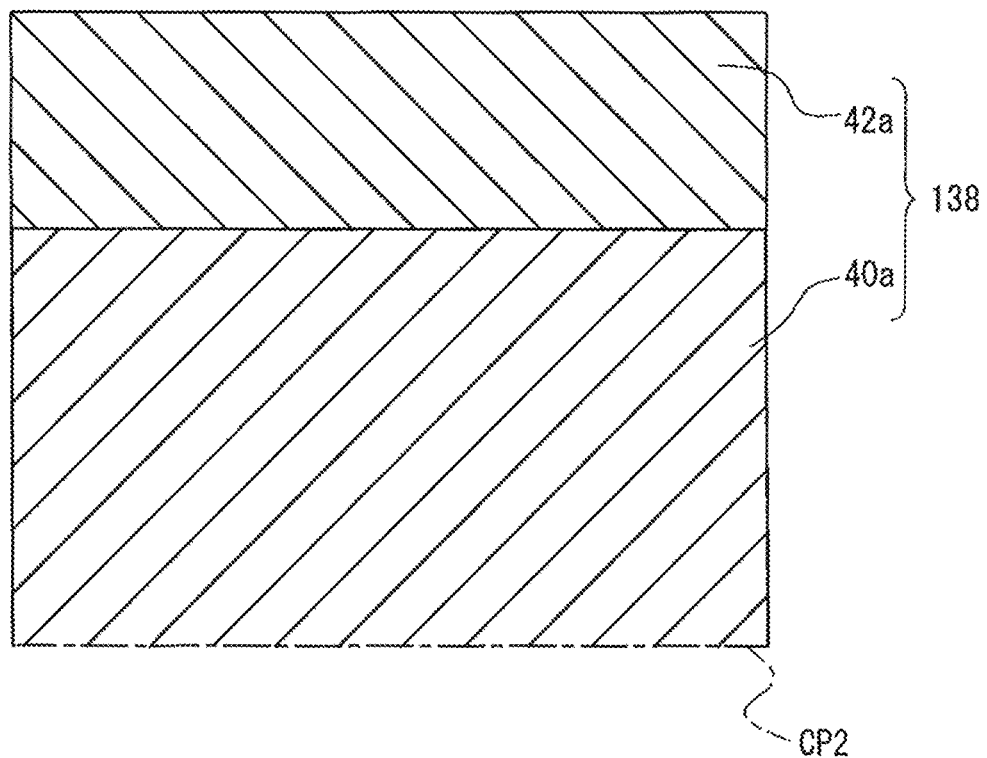
FIG. 22 is an enlarged exemplary view of a slide component.

The slide components 34, 66, 73, 75, 77, 79, 81, 83, 96, 98, 130, 132, 134 and 136 may have a different constitution from the slide component shown in FIG. 6. Referring initially to FIG. 22, a slide component 138 in accordance with a second embodiment comprises a base member 40a and an abrasion-resistant layer 42a. The slide component 138 may be one of the slide components 34, 66, 73, 75, 77, 79, 81, 83, 96, 98, 130, 132, 134 and 136 or another slide component in the bicycle 10. That is, the bicycle sprocket (e.g. at least one of S1 to S9, FS1, and FS2) comprises the slide component 138, the bicycle chain 28 comprises the slide component 138, and at least one of the pin member 80 and the roller member 82 of the bicycle chain 28 comprises the slide component 138. The base member 40a is made of one of a titanium alloy and an iron alloy. The titanium alloy may be an alpha beta titanium alloy including the alpha phase of titanium and the beta phase of titanium, which is described in the first embodiment. Alternatively, the titanium alloy may be a near beta titanium alloy or a beta titanium alloy. The iron alloy may be a martensitic stainless steel. The abrasion-resistant layer 42a is made of a material selected from the group consisting of titanium carbide (TiC), titanium carbonitride (TiCN) and titanium nitride (TiN). Each of titanium carbide, titanium carbonitride and titanium nitride is abrasion-resistant and enhances durability of the slide component 138.

Figure 23:
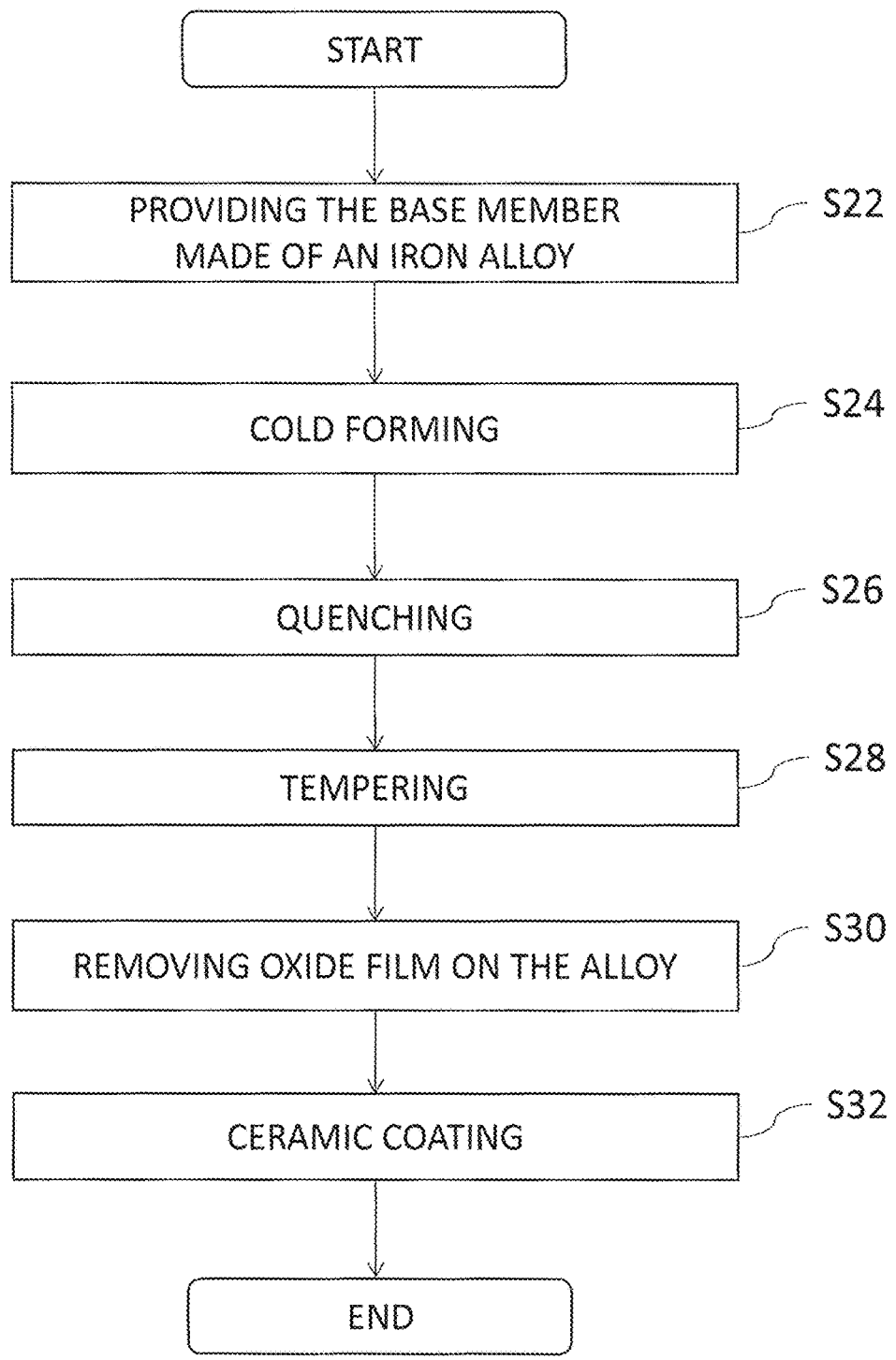
FIG. 23 is a flow chart of a method for manufacturing the slide component in accordance with the second embodiment of the present invention when a base member is made of an iron alloy.

FIG. 23 illustrates a flow chart of a method for manufacturing the slide component 138 when the base member 40a is made of the iron alloy. In the step S22, the base member 40a is provided. Material of the base member 40a is preferably a martensitic stainless steel. The iron alloy is usually oxidized naturally, thus the material of the base member 40a may include an oxide film on the iron alloy.

In the step S24, the provided base member 40a is cut or formed (e.g. rolled or pressed) into a predetermined shape at a temperature lower than 720 degrees Celsius. For convenience of the following description, the base member 40a processed in the step S24 is referred to as a cold formed base member 40a. In the step S26, the cold formed base member 40a is quenched to harden the base member 40a. In the step S28, the quenched base member 40a is tempered. For example, the quenched base member 40a is heated at a temperature ranging from 400 to 500 degrees Celsius for a time period ranging from 8 to 32 hours. The temperature and the period for heating depend on the iron alloy and its application. After the tampering, toughness of the base member 40a is enhanced.

In the step S30, the oxide film on the iron alloy is removed by polishing the tempered base member 40a with shot blasting or barrel grinding. For convenience of the following description, the base member 40a processed in the step S30 is referred to as a polished base member 40a. In the step S32, the abrasion-resistant layer 42a made of a material selected from the group consisting of titanium carbide (TiC), titanium carbonitride (TiCN) and titanium nitride (TiN) is formed on the polished base member 40a by chemical vapor deposition (CVD) or physical vapor deposition (PVD). For example, TiC is formed by reacting titanium tetrachloride ($TiCl_4$) with methane ($CH_4$) around 1000 degrees Celsius in a CVD reactor. TiCN is formed by reacting $TiCl_4$ with $CH_4$ and nitrogen gas ($N_2$) substantially around 1000 degrees Celsius in the CVD reactor. TiN is formed by reacting $TiCl_4$ with $N_2$ and hydrogen gas ($H_2$) around 1000 degrees Celsius in the CVD reactor.

Figure 24:
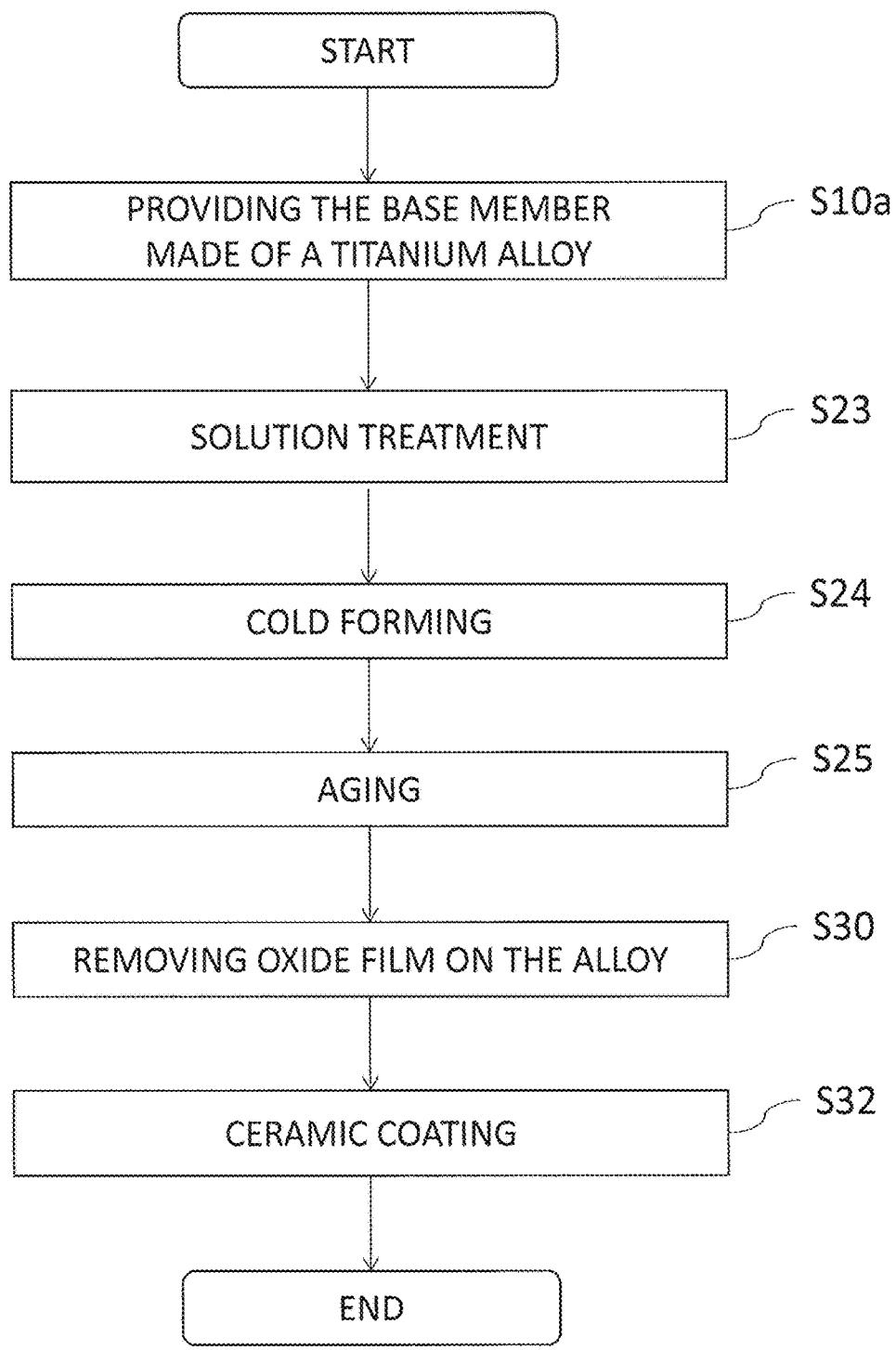
FIG. 24 is a flow chart of a method for manufacturing the slide component in accordance with the second embodiment of the present invention when a base member is made of a titanium alloy.

FIG. 24 illustrates a flow chart of a method for manufacturing the slide component 138 when the base member 40a is made of the titanium alloy. In FIG. 24, processes that are the same as those in FIG. 9 are denoted by the same reference numerals, and the overlapping description is omitted. In the step S10a, the base member 40a is provided. The material of the base member 40a can be an alpha beta titanium alloy, a near beta titanium alloy or a beta titanium alloy. In the step S23, the provided base member 40a is solution treated. In some applications, the step S23 can be omitted. The step S23 can be processed after the step S24, and the steps S23 and S24 can be repeated before the step S25. In the step S25, the solution treated base member 40a or the cold formed base member 40a is aged. Specifically, the solution treated base member 40a or the cold formed base member 40a is heated at a temperature ranging from 400 to 500 degrees Celsius for a time period ranging from 8 to 32 hours. The temperature and the period for aging depend on the titanium alloy and its application. The titanium alloy is usually oxidized in the step S25 when the aging is done in air atmosphere, thus the material of the base member 40a may include an oxide film on the aged base member 40a. The solution treatment in the step S23 and the aging in the S25 enhances the strength of the titanium alloy. After the step S25, the same processes as those for the base member 40a made of the iron alloy can be applied for the base member 40a made of the titanium alloy.

The slide component 138 has the following features. The slide component 138 comprises the plated layer 42a made of the material selected from TiC, TiCN and TiN. These materials are abrasion-resistant so that the abrasion-resistant layer 42a enhances durability of the slide component 138. Therefore, durability of the rear sprockets S1 to S9, the front sprockets FS1 and FS2, the bicycle chain 28 including at least one of the pin member 80 and the roller member 82 are enhanced.

It will be apparent to those skilled in the bicycle field from the present disclosure that the above embodiments can be combined with each other.

It will be apparent to those skilled in the fishing tackle field from the present disclosure that the above embodiments can be applied to the fishing tackle field. For example, gears in a fishing reel may comprise at least one of the slide components 34, 66, 73, 75, 77, 79, 81, 83, 96, 98, 130, 132, 134, 136, and 138 described above.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A slide component comprising:
    a base member made of a titanium alloy including alpha phase of titanium and beta phase of titanium, the base member including a surface having a plurality of recesses formed by removing at least part of the alpha phase of titanium without removing the beta phase of titanium from the titanium alloy; and
    a plated layer provided on the surface of the base member.

2. The slide component according to claim 1, wherein the alpha phase of titanium is partly replaced with zinc.

3. The slide component according to claim 1, wherein the plated layer includes nickel.

4. The slide component according to claim 1, wherein the plurality of recesses include at least one recess having a first length that ranges between 50 nanometers and 150 nanometers.

5. The slide component according to claim 4, wherein the at least one recess having a second length that ranges between 1 micrometer and 10 micrometers.

6. A bicycle component comprising the slide component according to claim 1.

7. A bicycle rear sprocket comprising the slide component according to claim 1.

8. A bicycle front sprocket comprising the slide component according to claim 1.

9. A slide component comprising:
    a base member made of a titanium alloy including alpha phase of titanium and beta phase of titanium, the base member comprising:
        an internal portion in which the titanium alloy has a first density of the alpha phase of titanium; and
        a border portion provided on the internal portion, the titanium alloy having a second density of the alpha phase of titanium in the border portion, the second density being lower than the first density; and
    a plated layer provided on the border portion.

10. The slide component according to claim 9, wherein the border portion further includes zinc.

11. The slide component according to claim 9, wherein the plated layer includes nickel.

12. A bicycle component comprising the slide component according to claim 9.

13. A bicycle rear sprocket comprising the slide component according to claim 9.

14. A bicycle front sprocket comprising the slide component according to claim 9.

15. A slide component comprising:
    a base member made of a titanium alloy, the base member comprising:
        an internal portion including alpha phase of titanium and beta phase of titanium; and a border portion provided on the internal portion, the border portion including zinc and the beta phase of titanium, the border portion including a surface having a plurality of recesses, the plurality of recesses being formed by replacing at least part of the alpha phase of titanium with zinc without replacing the beta phase of titanium; and a plated layer provided on the border portion.

16. The slide component according to claim 15, wherein each of the plurality of recesses has a longest length that ranges between 1 micrometer and 10 micrometers in a longitudinal direction along the surface, each of the plurality of recesses has a lateral longest length in a lateral direction perpendicular to the longitudinal direction, and the lateral longest length ranges between 50 nanometers and 150 nanometers along the surface.

17. A slide component comprising:
a base member made of a titanium alloy including alpha phase of titanium and beta phase of titanium, the base member comprising:
  an internal portion in which the titanium alloy has a first density of the alpha phase of titanium; and
  a border portion provided on the internal portion, the titanium alloy having a second density of the alpha phase of titanium in the border portion, the second density being lower than the first density; and
a plated layer provided on the border portion, the slide component being manufactured with a method comprising:
  providing the base member, the base member including a surface;
  removing at least part of the alpha phase of titanium without removing the beta phase of titanium at the surface of the base member to provide the border portion at the surface of the base member and the internal portion inside the border portion; and
  plating the border portion to dispose the plated layer on the border portion.

18. A slide component comprising:
a base member made of a titanium alloy, the base member comprising an internal portion including alpha phase of titanium and beta phase of titanium and a border portion provided on the internal portion, the border portion including zinc and the beta phase of titanium; and
a plated layer provided on the border portion, the slide component being manufactured with a method comprising:
  providing the base member made of the titanium alloy including the alpha phase of titanium and the beta phase of titanium, the base member including a surface;
  replacing at least part of the alpha phase of titanium with zinc without replacing the beta phase of titanium at the surface of the base member with zinc to provide the border portion at the surface of the base member and the internal portion inside the border portion; and
  plating the border portion to dispose the plated layer on the border portion.

19. A slide component comprising:
a base member made of a titanium alloy including alpha phase of titanium and beta phase of titanium, the base member including a surface having a plurality of recesses, each of the plurality of recesses having a longest length that ranges between 1 micrometer and 10 micrometers in a longitudinal direction along the surface, each of the plurality of recesses having a lateral longest length in a lateral direction perpendicular to the longitudinal direction, the lateral longest length ranging between 50 nanometers and 150 nanometers along the surface;
a plated layer provided on the surface of the base member, the plated layer including a first metallic material; and
a second metallic material positioned in at least one of the plurality of recesses between the base member and the plated layer, the second metallic material being different from titanium and the first metallic material.

20. The slide component according to claim 19, wherein the first metallic material is nickel.

21. The slide component according to claim 19, wherein the second metallic material is zinc.

22. A slide component comprising:
a base member made of a titanium alloy including alpha phase of titanium and beta phase of titanium, the base member comprising:
  an internal portion in which the titanium alloy has a first density of the alpha phase of titanium; and
  a border portion provided on the internal portion, the titanium alloy having a second density of the alpha phase of titanium in the border portion, the second density being lower than the first density; and
an abrasion-resistant layer provided on the base member, the abrasion-resistant layer being made of a material selected from a group consisting of titanium carbide (TiC), titanium carbonitride (TiCN), and titanium nitride (TiN).

23. A bicycle sprocket comprising the slide component according to claim 22.

24. A bicycle chain comprising the slide component according to claim 22.

25. At least one of a pin member and a roller member of a bicycle chain comprising the slide component according to claim 22.

* * * * *